US005740782A

United States Patent [19]
Lowi, Jr.

[11] Patent Number: 5,740,782

[45] Date of Patent: Apr. 21, 1998

[54] POSITIVE-DISPLACEMENT-METERING, ELECTRO-HYDRAULIC FUEL INJECTION SYSTEM

[76] Inventor: Alvin Lowi, Jr., 2146 Toscanini Dr., Rancho Palos Verde, Calif. 90275

[21] Appl. No.: 650,611

[22] Filed: May 20, 1996

[51] Int. Cl.$^6$ .......................... F02M 37/04; F02M 47/02; F16K 15/14

[52] U.S. Cl. .......................... 123/446; 123/447; 123/506; 239/89; 137/853

[58] Field of Search .................................... 123/445, 446, 123/447, 467, 41.31, 540; 239/96, 132, 132.5, 533.1, 533.2, 533.3, 585.1, 533.13, 533.14, 89

[56] References Cited

U.S. PATENT DOCUMENTS

| | | | |
|---|---|---|---|
| 2,630,326 | 3/1953 | Bryant | 137/853 |
| 3,481,542 | 12/1969 | Huber | 239/89 |
| 3,689,205 | 9/1972 | Links | 417/401 |
| 3,796,205 | 3/1974 | Links et al. | 123/139 E |
| 4,271,807 | 6/1981 | Links et al. | 123/506 |
| 4,459,959 | 7/1984 | Terada et al. | 123/446 |
| 4,462,368 | 7/1984 | Funada | 123/446 |
| 4,519,351 | 5/1985 | Archer | 123/446 |
| 4,576,338 | 3/1986 | Klomp | 137/853 |
| 4,635,849 | 1/1987 | Igashira et al. | 239/533.13 |
| 4,846,810 | 7/1989 | Gerber | 137/853 |
| 4,907,555 | 3/1990 | Fuchs | 123/446 |
| 4,948,049 | 8/1990 | Brisbon et al. | 239/96 |
| 4,957,085 | 9/1990 | Sverdlin | 123/41.31 |
| 4,979,674 | 12/1990 | Taira et al. | 123/467 |
| 5,121,730 | 6/1992 | Ausman et al. | 123/467 |
| 5,130,598 | 7/1992 | Verheyen et al. | 310/316 |
| 5,168,855 | 12/1992 | Stone | 123/446 |
| 5,245,970 | 9/1993 | Iwaszkiewicz et al. | 123/447 |
| 5,400,968 | 3/1995 | Sood | 239/132.5 |

FOREIGN PATENT DOCUMENTS

| | | | |
|---|---|---|---|
| 12522754 | 12/1969 | France | 137/853 |
| 193213 | 1/1957 | Germany | 137/853 |
| 281837 | 3/1952 | Sweden | 137/853 |

OTHER PUBLICATIONS

Mike Osnega, Apr. 1995, "Cat's HEUI System: A Look At The Future?" Diesel Progress, pp. 30–35.

Rob Wilson, Jun. 1995, "Advances in Diesel Engine Fuel Systems More Oommon than Common Rail," Diesel Progress, p. 26.

Mike Osnega, Jun. 1995, "The Year in Review," Diesel Progress, pp. 28–42, 60.

Rob Wilson, Jun. 1995, "DME Shows Promise As Drop–In 'Replacement' for Diesel Fuel; Tests Meet Carb 1998 Standard," Diesel Progress, pp. 108–109.

(List continued on next page.)

*Primary Examiner*—Thomas N. Moulis
*Attorney, Agent, or Firm*—Bruce Canter

[57] ABSTRACT

An improved, full-authority, digital-electronic-controlled cylinder fuel injection system for internal combustion engines is conceived that utilizes positive displacement metering and electrohydraulic actuation with pressure amplification, positive feedback control and self cooling. The injectors operate from a relatively low pressure common rail fuel supply that may be fed by either pumping or from a pressurized fuel tank. The injectors incorporate self cooling passages that enable continuous operation independent of engine cooling, if any. The injectors comprise a stepped piston freely oscillating in a cylindrical housing providing an actuation chamber at the large end and a metering cup and injection nozzles at the other. A third chamber is provided in between for handling a degree of piston leakage and ullage. Charging, metering, timing and injection functions are controlled by a cartridge-type, 3-way, electrically-actuated valve that may be manifolded with the injector as a unit or mounted separately and connected externally. An outward-opening, variable-area injector nozzle is used for improved injection quality and turndown characteristics with a reduced level and range of injection pressures.

26 Claims, 18 Drawing Sheets

OTHER PUBLICATIONS

N. John Beck, Robert L. Barkhimer, Michael A. Calkins, William P. Johnson and William E. Weseloh, 1984, "Digest Digital Control of Electronic Unit Injectors," SAE Technical Paper, 840273.

R.J. Hames, R. D. Straub, R.W. Amann, 1985, "DDEC Detroit Diesel Electronic Controlors," SAE Technical Paper, 850542.

Richard J. Hames, David L. Hart, Gregory V. Giham, Steve M. Weisman, Bernd E. Peitsch, 1986, "DDECII Advanced Electronic Diesel Control," SAE Technical Paper, 861110.

Bob Schulz, Jan. 1994, More Details On Navistar's Newest Diesel, Diesel Progress, pp. 60–61.

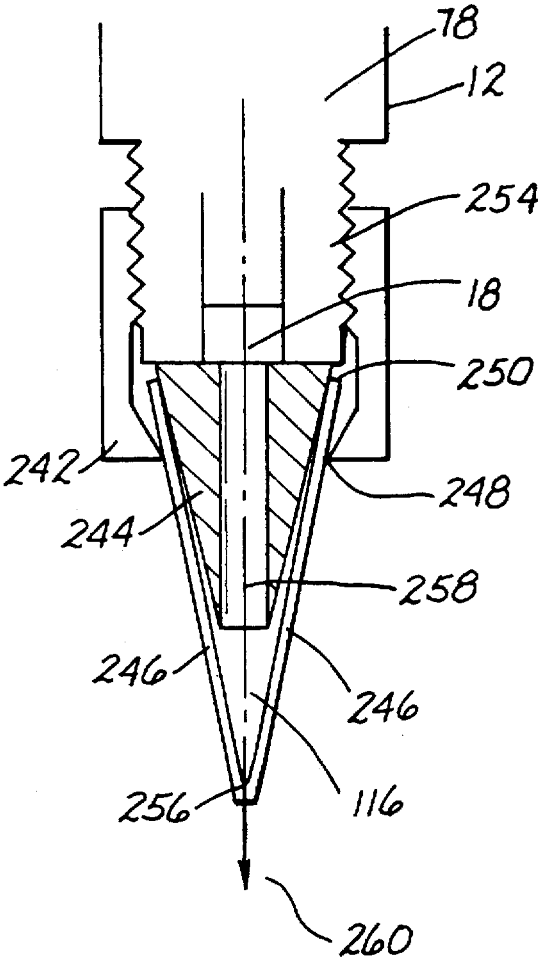
Fig. 6B
Fig. 6C
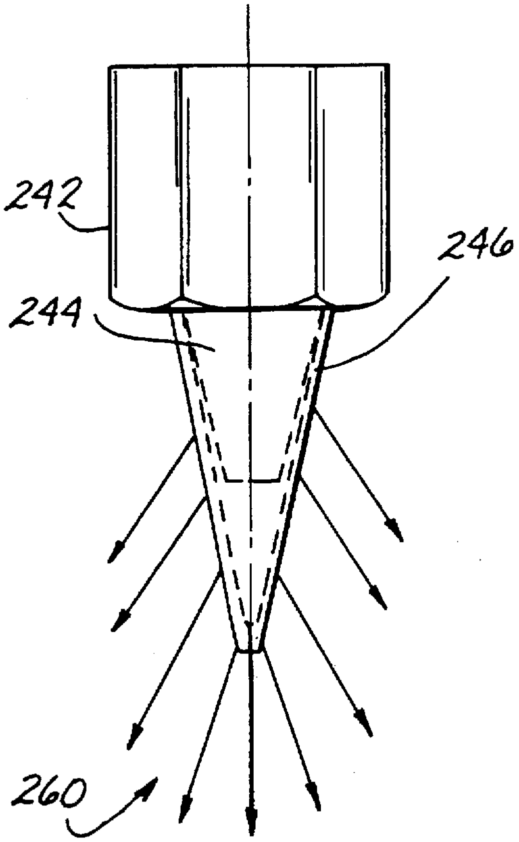
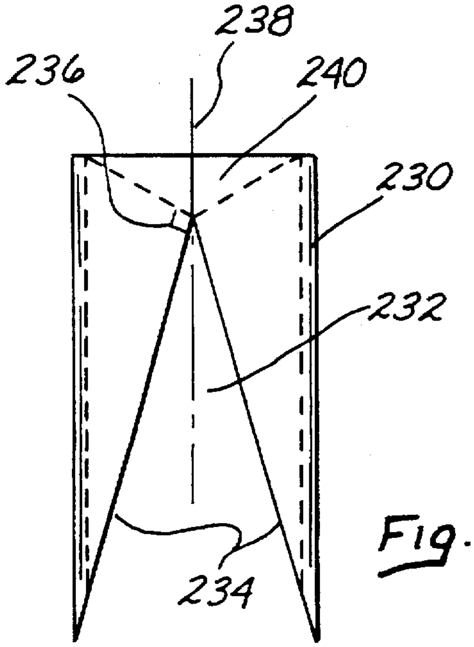
Fig. 6A

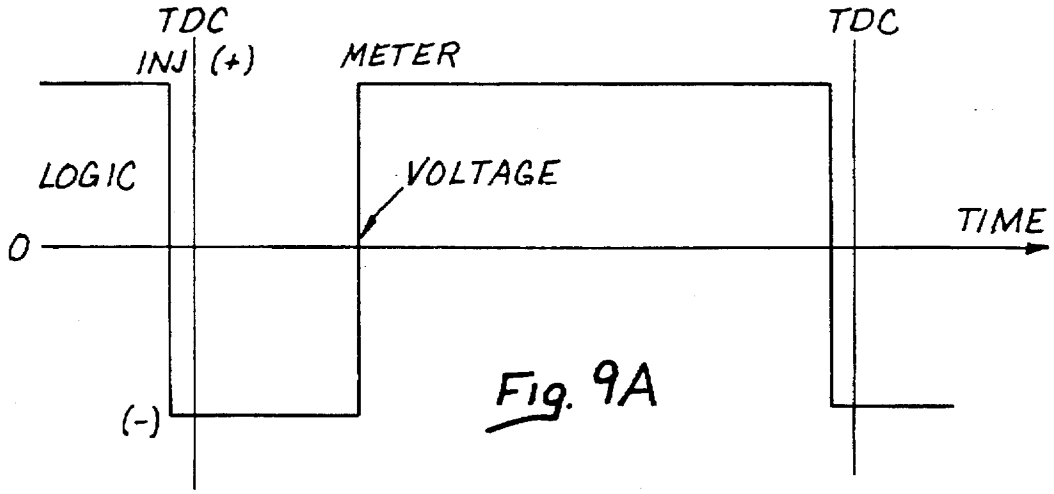
Fig. 9A
Fig. 9B
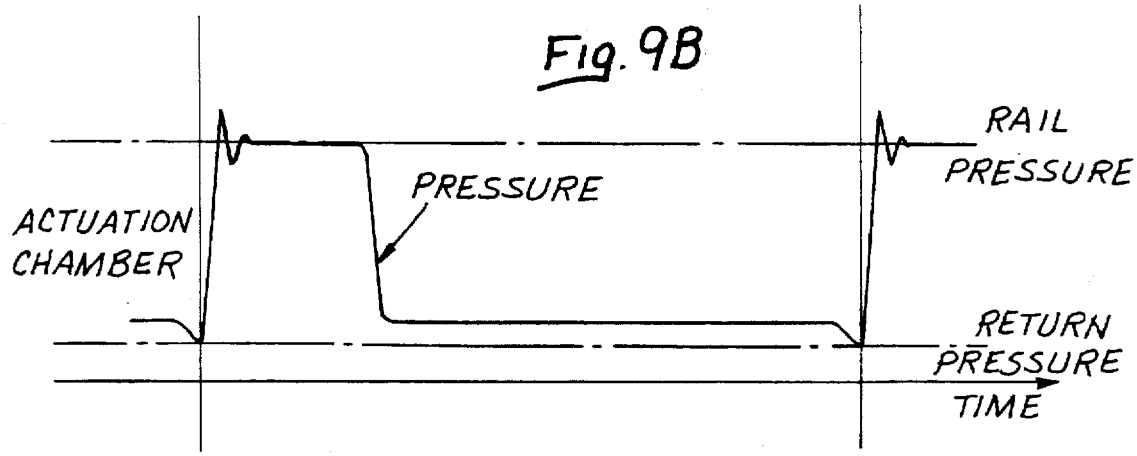
Fig. 9C
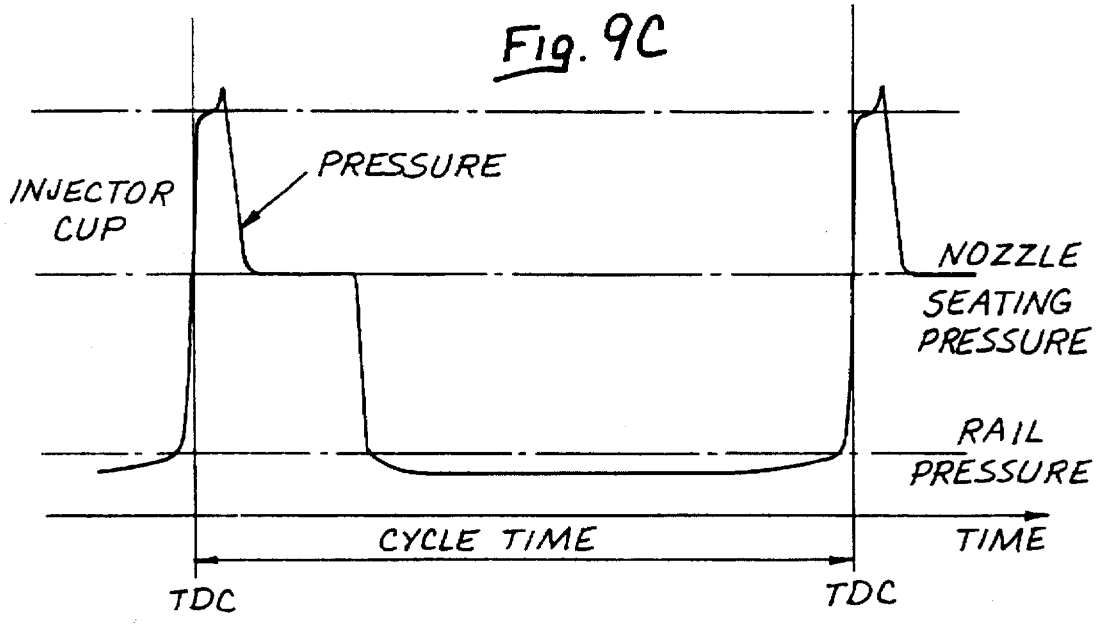

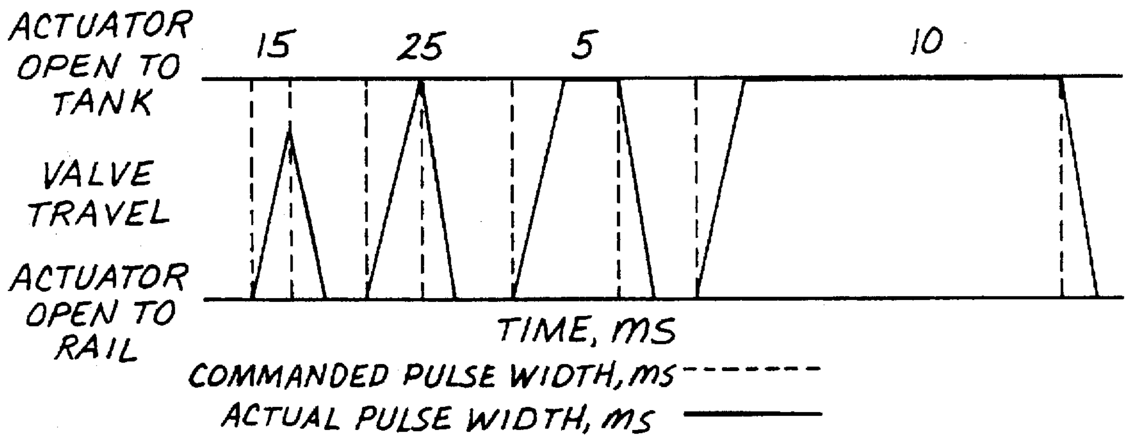
Fig. 10
Fig. 11
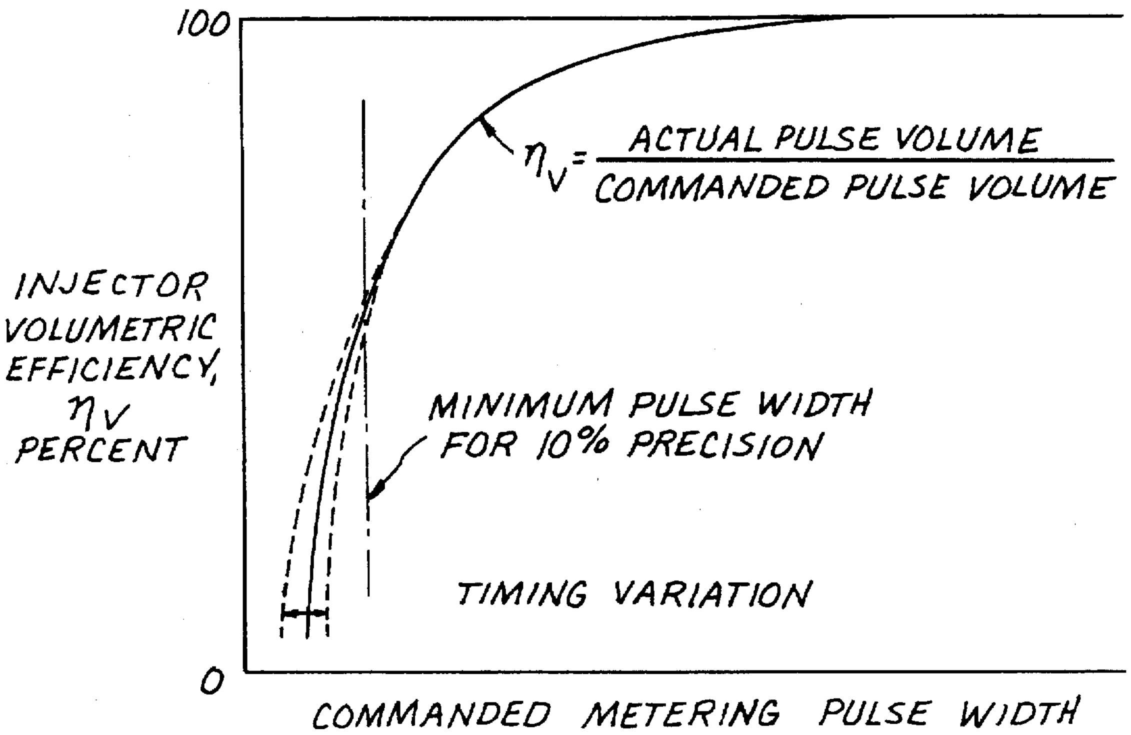

POSITIVE-DISPLACEMENT-METERING, ELECTRO-HYDRAULIC FUEL INJECTION SYSTEM

FIELD OF INVENTION

This invention relates to internal combustion engines, specifically to an improved fuel injector and a method and means for synchronized injection of liquid combustibles into the combustion chamber of engines such as diesels. The invention includes novel, thermally-isolated, electro-hydraulic metering and actuation, and pressure amplification means that can operate with low-pressure stored fluids and can utilize full-authority, digital electronic feed-back control free of dependence on cooling from the engine structure.

BACKGROUND—DISCUSSION OF PRIOR ART

Heretofore, fuel injection systems suitable for diesel engines and the like have relied on one or another form of mechanical "jerk" pump to provide the precisely metered and timed quantities of fuel at the extreme pressures and short durations required. Such injection systems vary widely in form and metering principle but virtually all utilize mechanically-driven, cam-actuated, closely-fitted, piston-type pumping elements to accomplish injection during a very small and precisely timed interval of the engine's operating cycle. Since modern diesel engines require the injection of controllably small quantities of fuel into the cylinder at the end of a compression process that is sufficiently severe to produce temperatures exceeding the auto-ignition temperature of the fuel, very high injection pressures are required. The back-pressure of the compressed cylinder charge is only a part of the injection pressure requirement. In addition, an even greater fluid pressure must be established in the injector in order to eject the fluid charge at the rate necessary to meet the cycle timing requirement as well as to attain the velocity and degree of atomization required to penetrate and mix into the dense air charge. Still higher pressures are required in most prior-art injection systems because they utilize inwardly-relieving-type injection nozzles in which the orifices that control admission of the fluid to the combustion chamber are opened and closed by the action of a spring-loaded needle valve that must be lifted hydraulically against such spring pressures. The pressure drop required to lift a needle-type delivery valve and transport the fluid pulse to and through the orifices is particularly burdensome because it is not readily converted to fluid velocity upon which injection quality depends. Moreover, the customary orifices are fixed in size so that fluid velocity achieved varies with the quantity injected. Thus, at low quantities, injection velocities may be too low for good injection quality.

Characteristic of many prior art injectors and injection systems is the loss of fuel metering precision and repeatability as well as injection velocity factors that combine to limit the range of useful engine operations and applications. This is generally known as the "turn-down" limitation. When prior art injectors are operated at less than about fifteen percent of their maximum design delivery (about a 7:1 turn-down ratio), engines using them exhibit undesirable characteristics such as uneven shaft output torque and increased exhaust emissions. These adversities can be avoided in those engine power applications that do not impose excessive variations in loads and speeds requiring a larger range of turn-down injector delivery. However, there are important compression-ignition (diesel) engine applications in which injector turn-down limitations are a handicap. Two examples are given as follows.

Motor vehicles subject their engines to large load and speed variations. In many, a large fraction of on-highway operating time is spent waiting in traffic, decelerating, descending grades and cruising at legal speeds. Under these conditions, the engine is required to run at a very light load or no load at all. Injector turn-down limitations described above account for excessive fuel consumption, exhaust emissions, noise and mechanical harshness.

Diesel engines are capable of operating with a supplementary fuel, in a mode known as dual-fuel operation. This is an established practice that consists of substituting a lower cost vaporous fuel such as natural gas or other suitable fuels for a significant fraction of the petroleum distillate fuel normally delivered to the engine by the fuel injectors. The vaporous supplementary fuel is usually transported into the combustion chamber as a mixture with the intake air stream. The liquid distillate fuel is injected directly into the combustion chamber as in ordinary diesel operation. The flexibility to operate at full power either as a conventional diesel or with a supplementary fuel is highly valued. A further objective is to displace a maximum of the distillate fuel by substituting a lower-cost gas over a wide load range and to the greatest degree possible in dual-fuel operation. The fraction of distillate fuel injected is known as the pilot charge because it is compression ignited to inflame the main fuel charge of gas premixed with air analogous to the use of a spark plug. Proper pilot injection for good dual-fuel operation requires less than five percent of the total fuel. Thus over 20:1 turndown is required of a suitable injection system. However, because of the limited turn-down capabilities of available diesel injectors, these objectives cannot be realized without engine modifications to install an additional set of injectors capable of performing the pilot injection requirements of dual fuel operation, with the original diesel injectors being retained for full diesel operation. This complication and expense detracts from the wider use of the dual-fuel technology, a complication that is attributable to the turndown limitations of prior art injection systems.

Other draw-backs of the prior art mechanical injection systems stem from the fact that they must be mechanically coupled to the engine shaft. This limitation leads not only to mechanical and/or hydraulic complications but it also possesses other negative ramifications as well. One such disadvantage is that running adjustments in injection timing require complicated and precise mechanisms. Another is that the injection pressures that can be delivered tend to diminish with engine speed which leads to reduced quality of injection, ignition and combustion upon engine lug-down and during idle conditions. Still another disadvantage attributable to pump-line systems is that the length of the high-pressure piping connecting the pump plunger to the injector adversely affects the timing and precision of the injected pulse of fuel due to the elasticity of the fluid and piping which cause complex pressure waves adversely affecting the transient flow of fuel from the injector.

An example of a prior art system is represented by the BKM/Servojet CRIDEC (common rail, intensified, direct electronic control) injection system (see BECK, N. J. et al., "Direct Digital Control of Electronic Injectors," Society of Automotive Engineers Paper No. 840273). While this prior art system overcomes some of the limitations of the mechanically-driven types, it has several drawbacks of its own. For example, the Servojet fixed-volume, accumulator-type injector relies on fluid compressibility for metering which is subject to wide variations in fluid properties. Applicable fluids differ greatly in their compressibility characteristics which complicates the design and application of the Servojet injector. Further negative ramifications include limited metering range and high rail or supply pressure characteristics, both of which are related to the compressibility phenomenon. High rail pressures are required to produce a significant degree of fluid density change at all and such rail pressures must be varied over a wide range and controlled to a precise degree to manage a limited range of quantity variation. Moreover, inasmuch as the Servojet injector depends on the hydraulic amplification principle, its injection pressure will vary directly with the rail pressure supplied whereupon small injection quantities will be injected at lower pressures and, therefore, lower velocities and longer durations. This characteristic has an adverse effect on engine performance at reduced load. Another adverse characteristic of the Servojet accumulator-type injector is that when large injection quantities are delivered, the rate of injection is very high at the beginning of the process and the rate falls off drastically toward the end. This puts an excessive quantity of fuel into the combustion chamber prior to ignition which occurs only after a certain delay that depends on the Cetane number of the fuel and the engine characteristics. The presence of such excessive quantities of unburned fuel in the combustion chamber prior to ignition produces an excessive rate of pressure rise when ignition does occur. Such pressure rise characteristics cause mechanical roughness known as diesel knock which is accompanied by noise, engine wear and increases in exhaust emissions. Thus, the Servojet injector is disadvantaged at high engine loads as well.

The Servojet CRIDEC injectors are also lacking any internal cooling means. No fuel is circulated within the injector housing whereby the heat of combustion would be effectively isolated from the closely fitted plunger. Such thermal isolation would have to be provided externally.

Still another example of a prior art injection system is the NAVISTAR/CATERPILLAR HEUI two-fluid electrohydraulic injector system (*Diesel Progress Engines & Drives*, Volume LXI No. 4, April 1995, pp. 30–35). This system utilizes high pressure engine oil as the hydraulic medium to effect a hydraulically-actuated unit injector fed by a low pressure fuel. This system uses a high speed solenoid valve to time the admission of high pressure oil for injection and to time the venting of that oil for metering under the impetus of a return spring. Thus, critical timing events are involved.

One drawback of the HEUI system derives from the extreme timing tolerances, speed and stability required in the solenoid valve which must also handle large instantaneous flow rates of a viscous medium. Another disadvantage is the possibility of fuel contamination of the engine oil. Other disadvantages include the use of return springs that are subject to variation and fatigue and the mechanical complications and exposure to leakage resulting from the use of an additional high-pressure fluid system.

All of the aforementioned prior art injection systems suffer from some or all of the following disadvantages:

1. High mechanical loads and complexity of drive, pumping and injection elements;
2. Decreased injection pressure with decreased engine speed (repetition rate);
3. Decreased injection pressure with decreased engine load (injection quantity);
4. Limited range, precision and repeatability of injected quantity;
5. Difficult control of injection timing during operation;
6. Limited injection pressures due to the limitations in the integrity of hydraulic lines and fittings;
7. Limited injection pressures and quantities due to limitations in supply pumping and control;
8. Loss of injection timing precision due to hydraulic pressure waves and transport volumes in lines and fittings;
9. Diminished injection pressures and range of delivery due to the injector nozzle valves and fixed area orifices used;
10. High supply pressures required;
11. Precise supply pressure control required;
12. High mechanical and/or hydraulic power required;
13. External or supplemental cooling of injector required;
14. Confirmation of injector quantity and timing is absent;
15. Poor matching of injector rate to ignition rate causing increased roughness and exhaust emissions;
16. Lack of injector flexibility to use different fluids;
17. Expensive solenoid construction because injectors require precise, repeatable and very short duration pulse control;
18. Limited injection system repetition rate which, in turn, limits the engine speed and power available without excessive smoke emissions.

OBJECTS AND ADVANTAGES

Accordingly, several objects and advantages of certain embodiments of my invention are:

1. to use a full-authority electronic control with injector plunger position feedback for the precise management of the timing, quantity, pressure and rate of injection;
2. to enable operation from a constant, low-pressure, common-rail fluid supply with or without pumps;
3. to employ a hydraulically amplified and actuated injector plunger without mechanical drives or lengthy high-pressure piping;
4. to use a constant velocity injection nozzle to maximize delivery velocity at any injection pressure over a wide delivery range;
5. to utilize positive displacement metering with plunger position sensing for precise feedback control of the quantity and timing of delivery;
6. to use a single three-way, cartridge-type, electrically-actuated valve for injection metering and initiation of the injection pulse;
7. to obtain injection quantity modulation without requiring mechanical positioning of plunger or sleeve elements;
8. to provide cooling features within the injector by utilizing the fluid to be injected;
9. to eliminate the need for purging the injector of gases and contaminants that may enter the injector from external sources;
10. to eliminate high pressure hydraulic lines and fittings that can limit the pressure and transient response of injector delivery;
11. to simplify the mechanical and hydraulic characteristics of the injector's construction, installation and operation including integration in an ISO 9000 cartridge assembly;
12. to eliminate, in some applications, the use of springs in injector construction and operation;
13. to increase the range of speed and quantity of injection from a given size of injector without loss of injection pressure or increase of the duration of the injection event;

14. to obtain a more uniform and constant rate of injection at any speed or quantity;
15. to accommodate a wide variety of fluids regardless of their viscosity, density or compressibility; and
16. to provide direct evidence of injector plunger motion whereby the control of injection timing and quantity can be assured with precision and repeatability at any repetition rate and quantity of injection.

Further objects and advantages of certain embodiments of my invention are to provide an injector and a system which can easily and conveniently provide direct cylinder injection of fuel to a compression ignition engine over a wide load and speed range with a variety of fuels having differing properties, which can be readily adapted to such engines of different sizes and designs regardless of engine cooling available, which can more easily provide multiple injection points and stages of injection, and which can provide a sufficient turn-down range to accomplish dual-fuel diesel operation. Still further objects and advantages will become apparent from a consideration of the ensuing description and drawings.

DESCRIPTION OF DRAWINGS

FIG. 6A shows a schematic diagram of tubular parts composing variable area fan jet nozzle;

FIG. 6B shows a section view of fan jet nozzle assembly;

FIG. 6C shows an outboard profile of fan jet nozzle and plan view of jet pattern produced;

FIG. 9A depicts the signal logic used to effect the operating sequence of the injector;

FIG. 9B depicts the pressure history of the injector actuation chamber in response to the logic signal;

FIG. 9C depicts the pressure history of the injector cup in response to the logic signal and the actuation chamber pressure;

FIG. 10 illustrates the metering pulse waveforms resulting from commanded pulses of various durations; and FIG. 11 is a graph of the actual pulse volume metered as a fraction of the volume equivalent of the commanded pulse width as a function of the commanded pulse width.

DESCRIPTION OF INVENTION

Figure 1A:
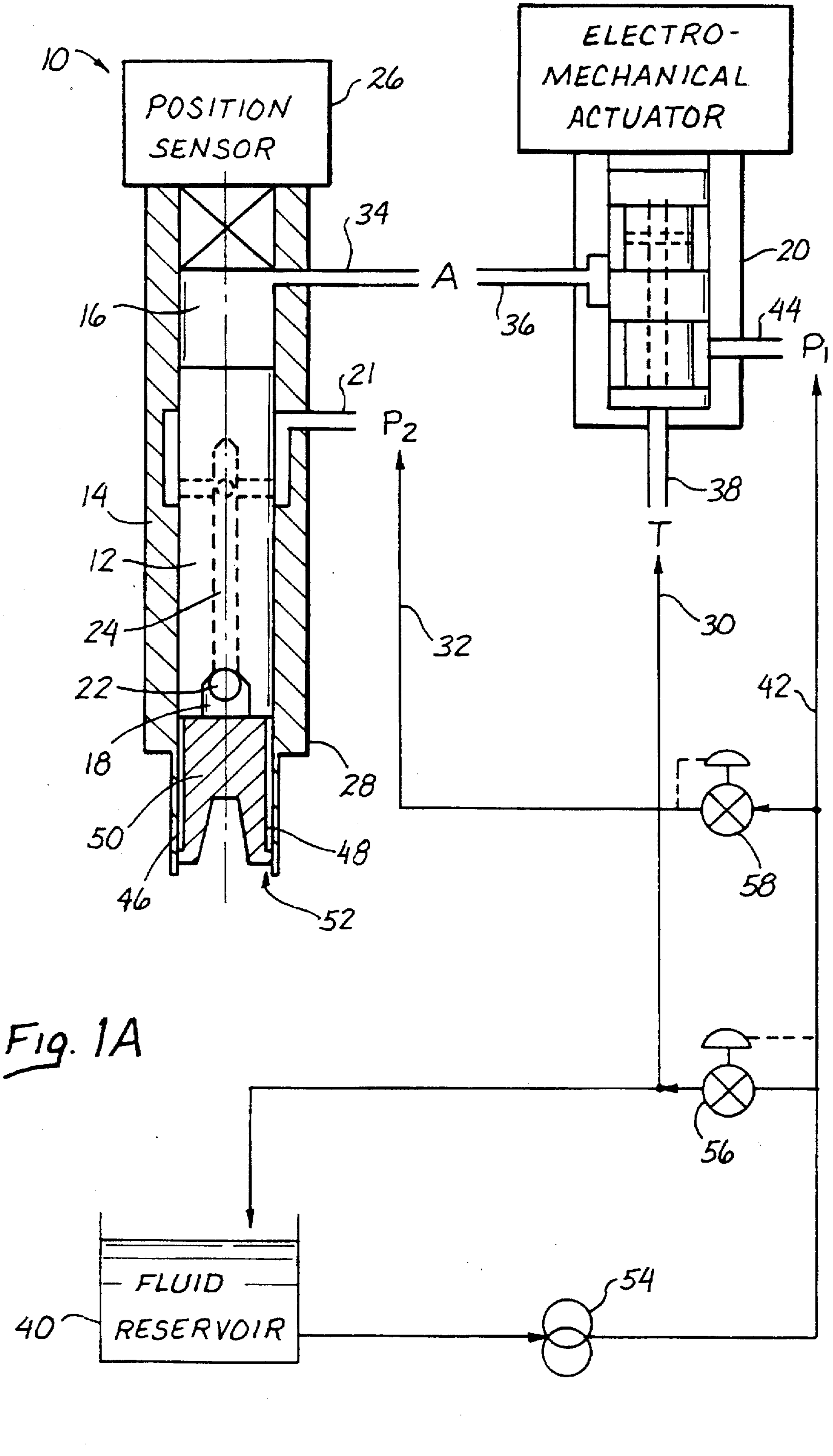
FIG. 1A shows a schematic drawing of a first exemplary embodiment of the electrohydraulic injector of my invention

FIG. 1A shows a schematic diagram of the a first exemplary embodiment of the electrohydraulic injector 10 of my invention. Cylindrical plunger 12 is closely fitted into the cylindrical bore of injector body 14 such that it can freely oscillate axially under the impetus of hydraulic pressure differences imposed between actuation chamber 16 and cup 18. Fluid is supplied to injector 10 at two different pressure levels. Fluid at pressure $P_1$ is the actuation medium controlled by three-way, two position electrically actuated spool valve 20. Fluid at lower pressure $P_2$ is supplied to port 21 in injector body 14 that communicates continuously with cup 18 via ball check valve 22 and central bore 24 in plunger 12.

Actuation chamber 16 is formed by the head space provided above plunger 12 and below position sensor 26. Cup 18 consists of the space formed between the lower end of plunger 12 and the nozzle flange 28.

In operation, the fluid volume in the cup at pressure $P_2$ is established when control valve 20 vents actuation chamber 16 to tank return rail 30. $P_1$ acting against the lower face of plunger 12 develops a greater force upward than the tank pressure acting downward on the equal area of the upper face of plunger 12 exposed to such tank pressure. This accelerates plunger 12 upward, such motion being accompanied by filling cup 18 with fluid via port 21, plunger bore 24 and check valve 22 from pressure rail 32 and emptying chamber 16 via injector housing port 34 and ports 36 and 38 of control valve 20 to tank 40. Such motion is ended when position sensor 26 signals controller that a predetermined cup volume has been reached, or after a predetermined time has passed as calculated by the controller based on the anticipated fluid flow rate to fill cup 18 to a given volume. Upon the determination that the desired cup volume has been established, the controller signals the valve spool actuator 41 to switch the connection of port 34 from tank return rail 30 (via port 38) to pressure rail 42 $P_1$ (via port 44). Now a higher pressure exists on the upper face of plunger 12 than the lower such that a net force develops on the plunger in the downward direction. This force tends to accelerate plunger downward raising cup pressure over $P_1$ causing ball check 22 to close plunger bore 24 trapping the measured volume of fluid in cup 18. With the continued downward motion of plunger 12, the fluid volume is compressed into nozzle passages 46 until a sufficient pressure level lower than $P_1$ but higher than $P_2$ is reached causing outer nozzle tube 48 of nozzle 50 to flex outward opening a gap at seat 52 allowing external flow from cup 18. Such flow continues until plunger 12 comes to rest against the face of nozzle flange 28.

Two levels of fluid supply pressure are required with either one or two fluid sources. If a common fluid is used for actuation and injection, only one tank return is required. This is the arrangement shown in FIG. 1A, indicating alternative means for establishing the two pressure levels. Solid lines show injector 10 supplied by a single pump 54 which is capable of delivering the total flow required for both actuation and injection. In this arrangement, pressure $P_1$ is established by relieving pressure rail 42 ($P_1$) to tank 49 via $P_1$ pressure relief valve 56 if pump 54 delivery pressure tends to exceed $P_1$. Pressure $P_2$ is established in $P_2$ rail 32 by supplying that rail from $P_1$ rail 42 via $P_2$ pressure regulating valve 58.

Figure 1B:
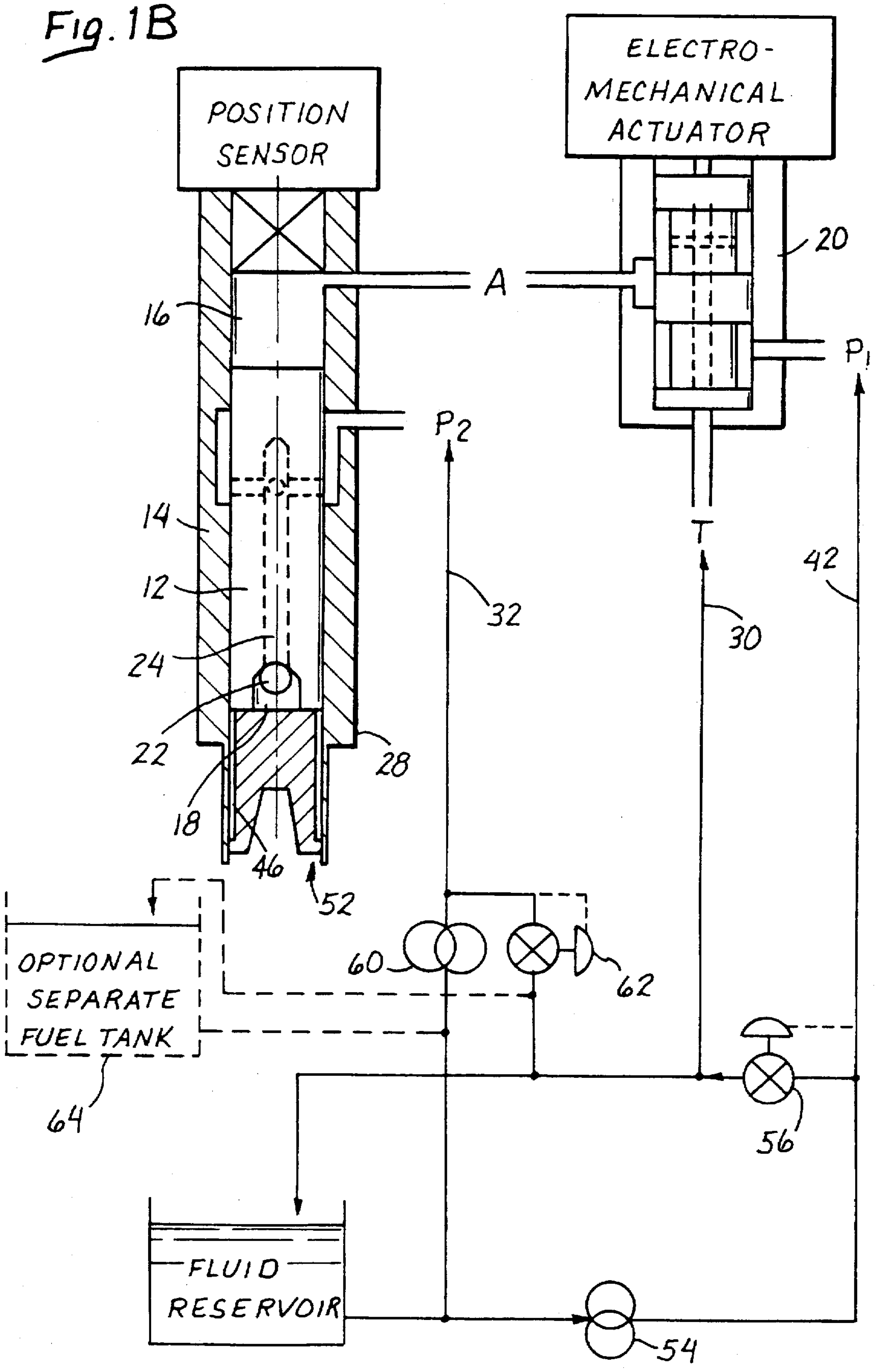
FIG. 1B shows a schematic diagram of an alternate exemplary embodiment of the electrohydraulic injector of my invention.

Alternate means of establishing the required fluid flow and pressure levels are shown in FIG. 1B by broken lines. One such alternative applicable to a common fluid is to use a separate $P_2$ pump and relief valve 62 for operating in parallel with those features for $P_1$. When the fluid to be injected is separate from the actuation medium, such separate pumping arrangement is connected to a separate tank 64 containing such fluid.

Figure 1C:
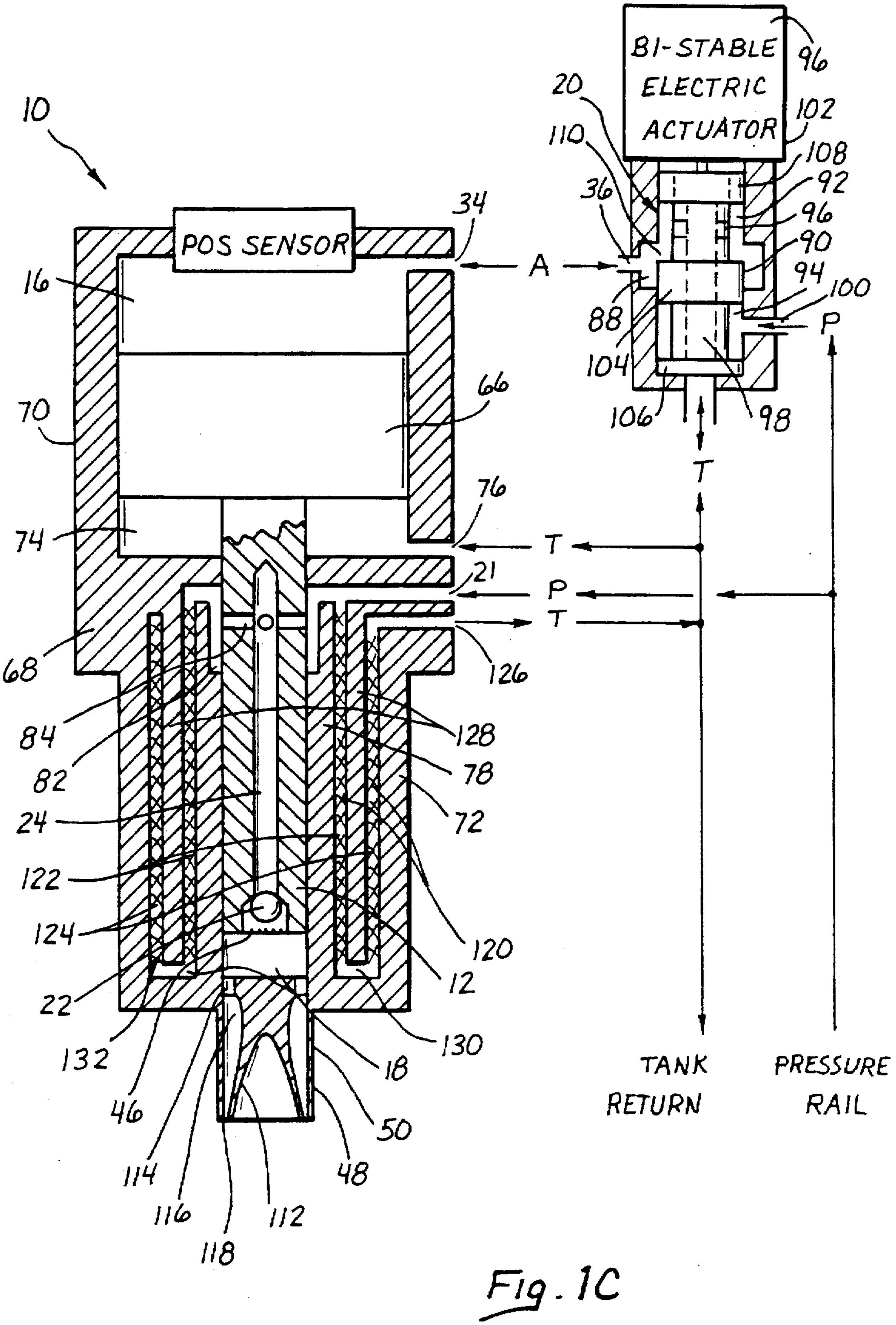
FIG. 1C shows a schematic diagram of an another alternate exemplary embodiment of the electrohydraulic injector of my invention, wherein a single fluid is utilized.

FIG. 1C shows a schematic diagram of another alternate exemplary embodiment of the electrohydraulic injector 10 of my invention, wherein a single fluid is utilized. Plunger 12 attached coaxially to piston 66 together comprise a stepped piston assembly that is precisely fitted into a stepped cylindrical housing 68 comprising upper injector body 70 and lower injector body 72. The assembly comprising piston 66 and plunger 12 fits into a cylindrical bore in injector body housing 70 and 72 such that it can oscillate freely in the axial direction under the impetus of hydraulic pressure differences imposed between actuation chamber 74 and cup 18. Fluid leakage past piston 66 and plunger 12 is accommodated by the connecting leak-off chamber 74 to fuel tank (not shown) via tank return port 76 to maintain minimum pressures continuously.

The plunger end of body 68 is shown in FIG. 1C as barrel 78 which is closed at its outer end by nozzle 50 to form closed cup 18 comprising the volume enclosed between plunger 12, barrel 78 and nozzle 50. This volume is determined by the positive displacement of piston 66 attaching plunger 12 subject to control based on high-speed piston position measurements utilizing non-contact position sensor 26. Position sensor 26, which may be of the eddy current or capacitative type known in the art, establishes the upward displacement of piston 66 required to meter the volume to be injected by the subsequent downward displacement of plunger 12 ejecting the fluid volume in cup 18 through nozzle 50.

Cup 18 is continuously connected to the fuel supply rail via port 21 which permits the flow of fuel under rail pressure into plunger manifold 82, through cross-drilled plunger passages 84, into longitudinal plunger bore 24, about free ball check valve 22, through ball retainer 86 into cup 18. Such flow can occur whenever the pressure in cup 18 is less than the rail pressure maintained at port 21. Rail pressure in cup 18 acting on cross-sectional area of plunger 12 is sufficient to rapidly accelerate piston assembly upward when actuation chamber 16 is ported to tank return allowing the pressure acting on the larger area piston 66 to fall to tank pressure.

Figure 2:
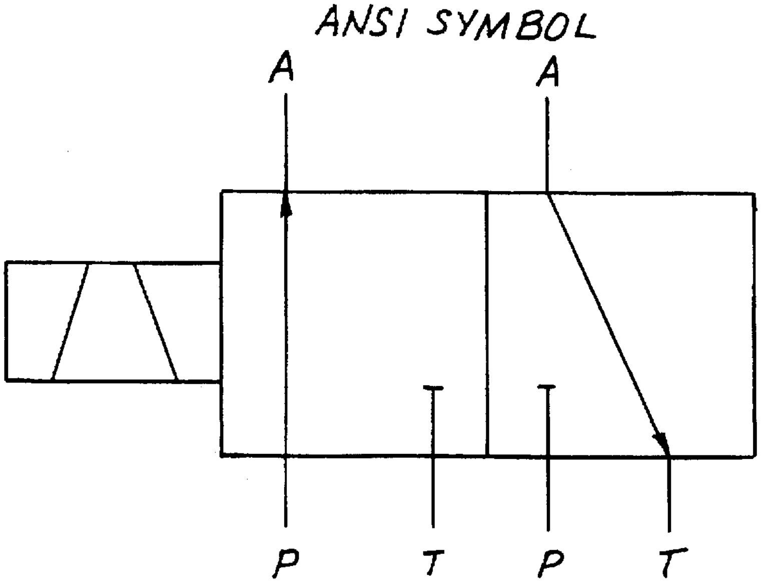
FIG. 2 shows the ANSI symbol for the bi-stable electrically-actuated control valve shown schematically in FIGS. 1A–1D.

Actuation Chamber 16 is connected to control port 36 of 3-way, two-position control valve 20 via annular manifold 88 and port 34. Control valve spool 90 alternatively connects annular manifold 88 to annular chamber 92 or annular chamber 94 according to the position of spool 90 as controlled by bi-stable electric actuator 41. In one extreme position shown in FIG. 1C, annular manifold 88 is connected to tank return port 38 via annular space 92 and drilled passages 96 and 98 thus connecting actuation chamber 16 to tank return via port 38. In the other extreme position of valve spool 90 (not shown), annular manifold 88 is connected to annular space 94 which is maintained at rail pressure via port 100. In this state, rail pressure is applied to actuation chamber 16 whereas in the alternate state, actuation chamber 16 is vented to tank. Pressure forces on spool 90 are perfectly balanced by providing equal and opposite areas on sides of pistons 102, 104 and 106 exposed to the differing fluid pressures in both radial and axial directions. Tank pressures are maintained at each end of spool 90 by central passage 98, cross-drilled passage 96 and slots 108. Valve spool 90 provided with pistons 102, 104 and 106 requires only a small axial displacement to open a large annular flow area 110 at either edge of annular manifold 88. The ANSI symbol for control valve 20 actuated by bi-stable electric actuator 41 is shown in FIG. 2.

Figure 3:
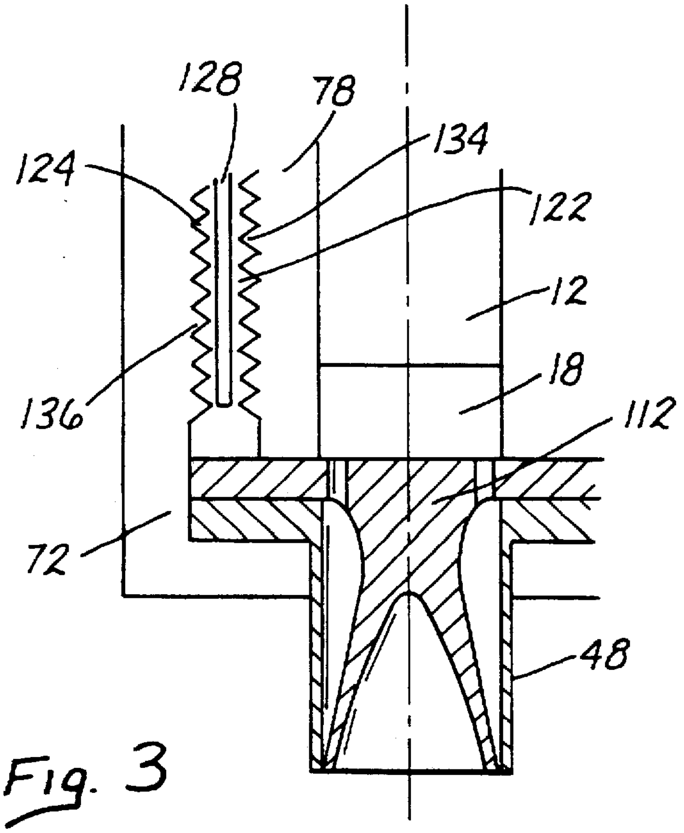
FIG. 3 shows a partial section view of the injector barrel containing cooling passages.

FIG. 1C also shows one of the preferred embodiments comprising a variable-area, outward-opening injection nozzle 50 which further comprises inner body 112, flexible outer tube 48 and flange 28. Flange 28 contains holes 114 that allow cup 18 to communicate with annular space 116 formed between inner body 112 and outer tube 48. Inner body 112 is fitted into the inner bore of tube 48 with a sufficient interference to seal the space 116 against flow until the pressure in space 116 exceeds a certain value in excess of the pressure of the external environment. Such a pressure difference produces sufficient tensile hoop stress in tube 48 to elastically deflect that part in excess of its interference fit with inner body 112 to create an annular gap between them at contact point 118 constituting a flow area that varies with the excess of opening pressure difference. As a result, all of the pressure developed by the injector is converted to fluid velocity in annular area 116 and such velocities remain high at all flow rates because the area in gap 116 varies with the flow. An expanded partial section view of the nozzle end of an exemplary embodiment injector is shown in FIG. 3.

Another aspect of the exemplary embodiment of FIG. 1C, consists of cooling jacket 120 comprising an inner annular passage 122 and an outer annular passage 124. Inner annular passage 122 is manifolded to full-time rail pressure port 21 in common with plunger manifold 82. Outer annular passage 124 is manifolded to full-time tank return port 126 which, in turn, is connected in common with tank return port 76 communicating with leak-off chamber 74. Inner annular passage 122 is separated from outer annular passage 124 by annular baffle 128 which provides gap 130 at its outermost extremity allowing flow to pass from inner annular passage 122 to outer annular passage 124 in a series manner.

The annular passages 122 and 124 comprising cooling jacket 120 contain surface extending media 132 which enhances the convective heat transfer between the fuel flowing in the jacket passages and the material of plunger barrel 78 and injector body 68. Media 132 also provides an appropriate flow restriction to limit the flow rate in jacket 120. In a preferred embodiment shown in FIG. 3, the media is comprised of a fine helical thread form. A male thread 134 is applied to the outer surface of barrel 78 and a female thread 136 is applied to the inside surface of lower injector body 72. Clearance is provided between the crests of male thread 134 and female thread 136 which is snugly filled by baffle 128 such that a helical flow path is formed in the thread roots and the flow path is helically downward in inner annular passage 122 and helically upward in the outer annular passage 124.

Figure 1D:
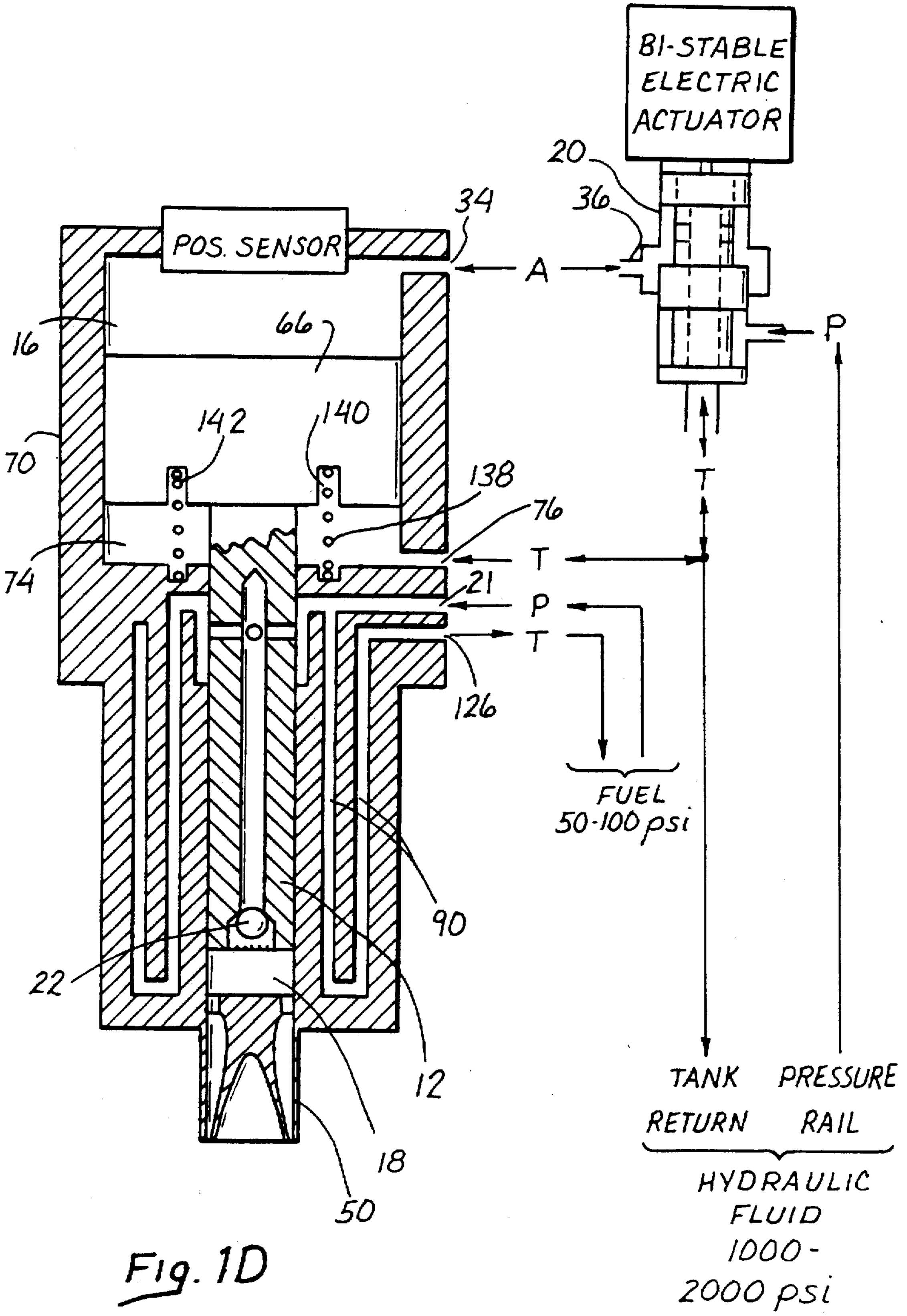
FIG. 1D shows a schematic design of yet another alternate exemplary embodiment of the electrohydraulic injector of my invention utilizing two fluids.

Another exemplary embodiment of the injector of my invention, illustrated in FIG. 1D, utilizes two fluids instead of one. In this embodiment, a fluid other than the fuel is used as the hydraulic actuation medium. Ports 34 and 76 are respectively connected to control port 36 of control valve 20 and a separate hydraulic fluid tank return. Ports 21 and 126 are connected respectively to a separate low pressure fuel supply and the fuel tank return. In this arrangement, return spring 138 located in annular slots 140 and 142 in the bottom side of piston 66 and cylinder 70 forming leak-off chamber 74 provides the force required to move piston 66 upward when actuation chamber 16 is vented for metering. Otherwise, this arrangement is the same as shown in FIG. 1C.

Figure 1E:
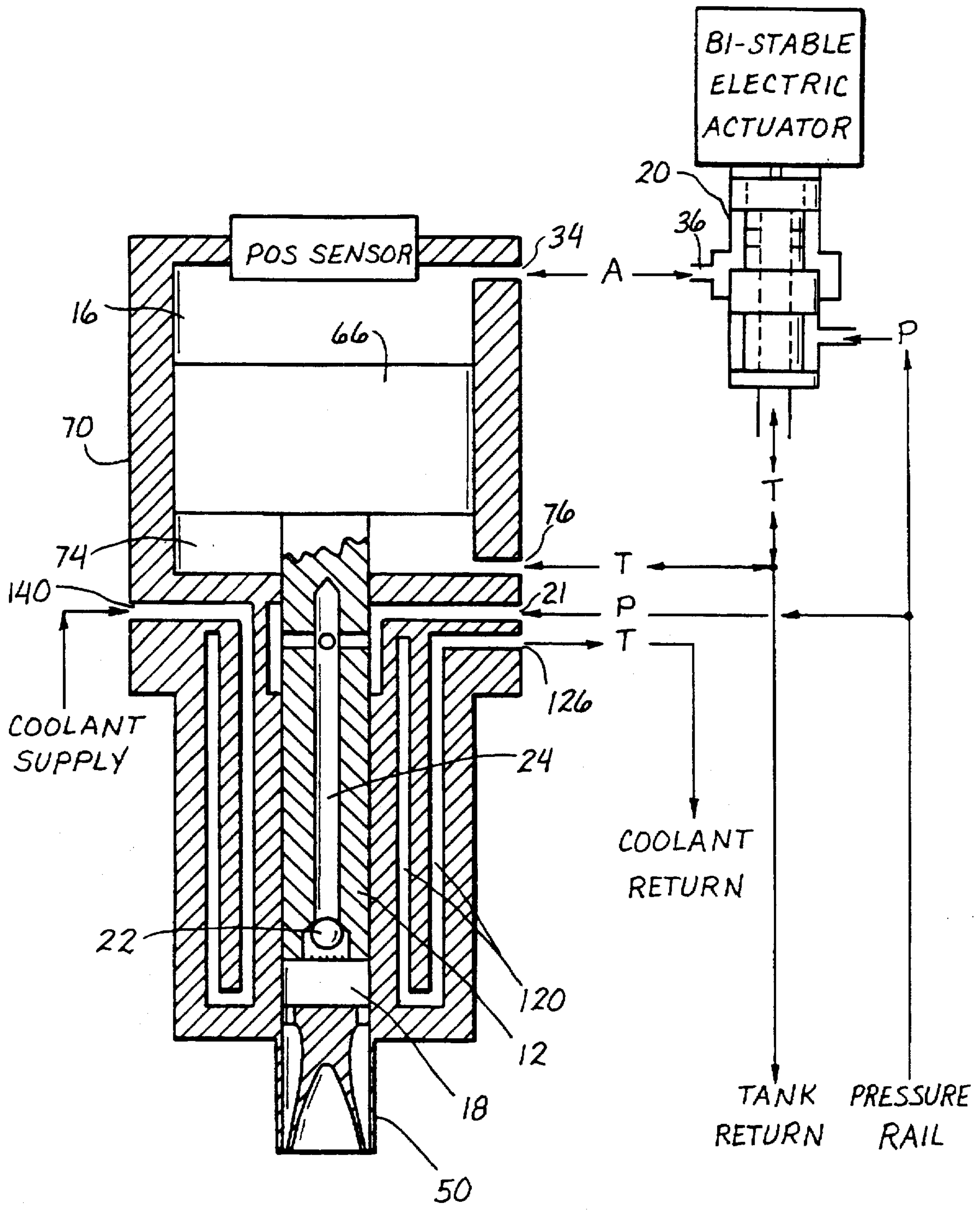
FIG. 1E shows a schematic design of another two fluid embodiment of the electrohydraulic injector of my invention.

Still another exemplary embodiment is shown in FIG. 1E. In this alternate two-fluid embodiment, the fuel is utilized as the hydraulic fluid. However, a separate fluid is utilized as the coolant. As in the embodiment of FIG. 1A, ports 34 and 76 are respectively connected to control port 36 of control valve 20 and the combined fuel/hydraulic fluid tank return and port 21 is connected to the fuel supply rail. However, in this embodiment the coolant enters port 140, travels through cooling jacket 120 and returns through port 126. Note that there is no fluid communication between port 21 and cooling jacket 120. Nor is there any fluid communication between port 21 and port 140. Fuel which has entered port 21 is injected through cup 18 and nozzle 50 and does not enter cooling jacket 120, and coolant does not enter bore 24.

Figure 1F:
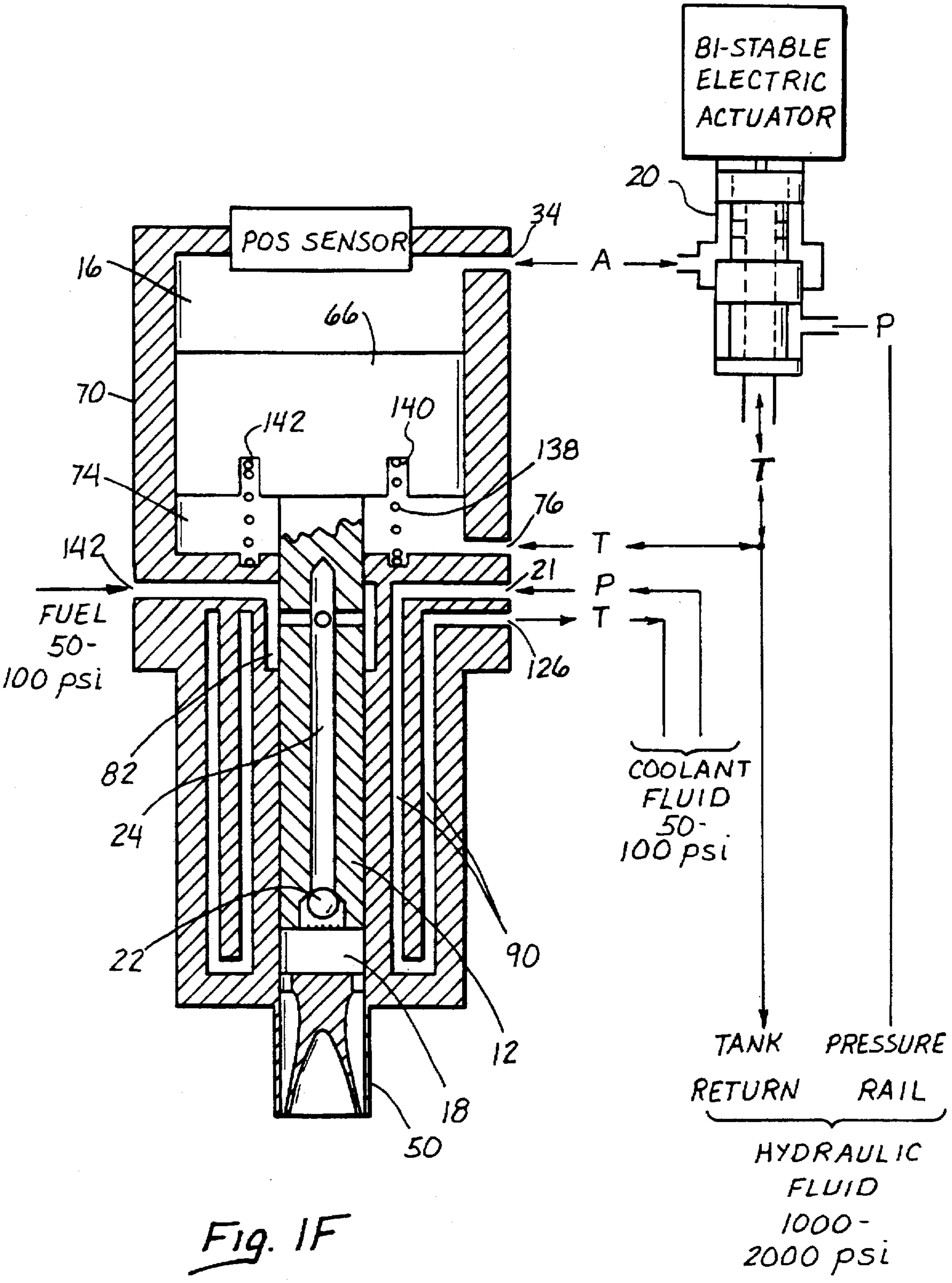
FIG. 1F shows a schematic design of a three fluid embodiment of the electrohydraulic injector of my invention.

Still yet another exemplary embodiment injector is shown in FIG. 1F. This arrangement utilizes a third fluid that can be selected for its thermal transport properties. In this arrangement, speared fuel port 142 is added dedicated to supplying low pressure fuel to cup 18 via plunger bore 24 and check valve 22. Cooling jacket 120 is fed through port 21 and drained through coolant return port 126 or vice verse, and is isolated from injector plunger fuel feed chamber 82 enabling the use of a separate cooling fluid. The heat transfer advantages of coolants such as water and glycol over fuels such as diesel are apparent to those skilled in the art of heat exchange.

Figure 4A:
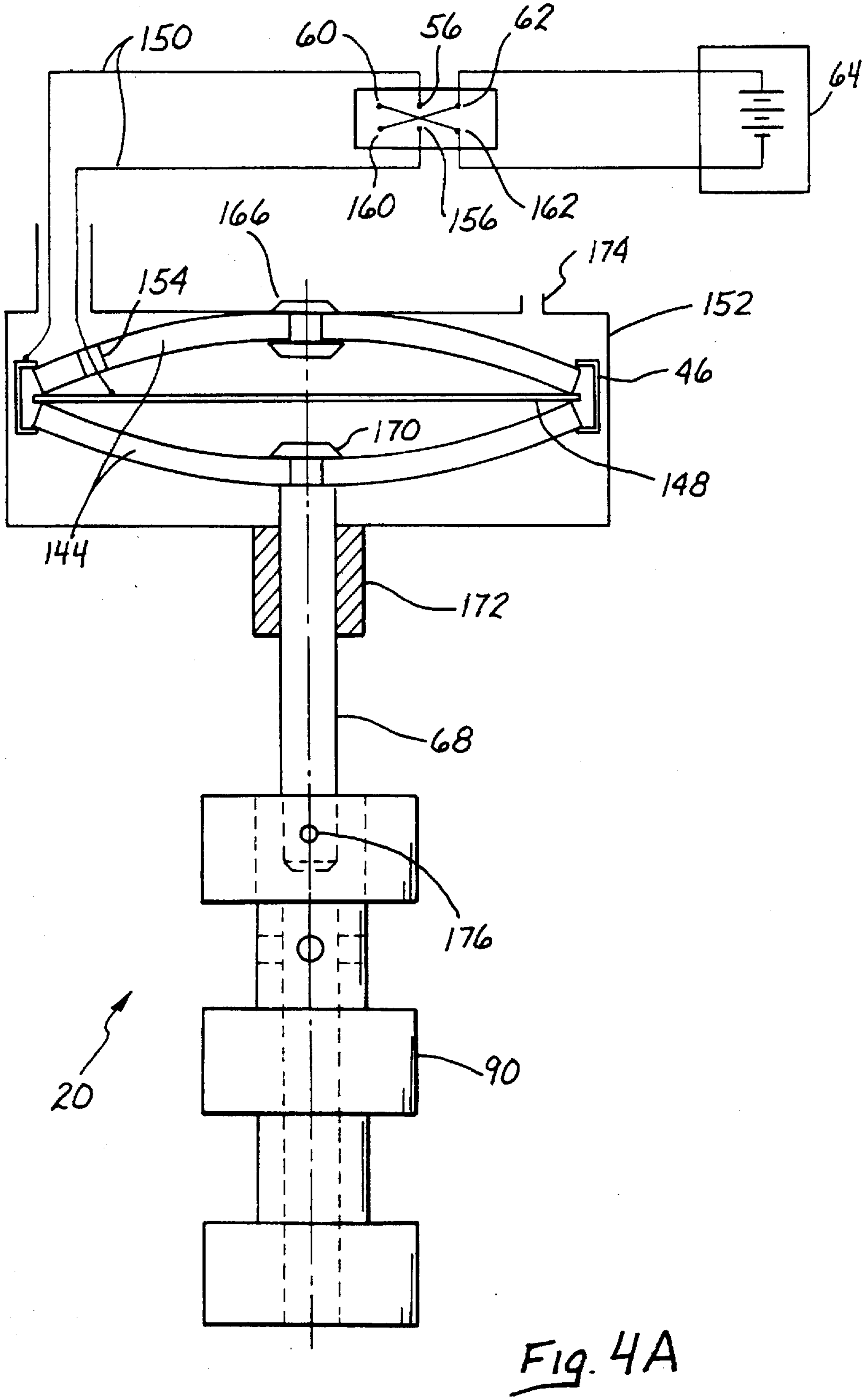
FIG. 4A shows a schematic diagram of a piezoelectrically actuated valve spool.

FIG. 4A shows a schematic diagram of a preferred embodiment of control valve 20 using a piezoelectrically-actuated balanced pressure spool. In this embodiment, a pair of dished, disk-type ceramic piezoelectric elements 144 known as "Rainbow" actuators[1] are stacked with concave sides facing each other and connected in electrical parallel through retainer contact ring 146 and inner electrical contact disk 148. Electrical leads 150 connecting outer retainer/contact ring 146 and inner contact disk 148 are brought out of housing 152 via electrical pass through 154 to be connected to the common contacts 156 of double-pole, double-throw relay 158. The switched poles 160 and 162 of the relay 158 are connected so as to reverse the polarity of power supply 164 applied to the piezoelectric elements 144 when the relay 158 changes state. Thereby, when the common contacts 156 are alternatively connected to the switched poles 160 and 162, the polarity of the electric power applied to the parallel-connected piezoelectric elements is reversed. Under forward polarity power, the curvature of the dished piezoelectric elements is reduced. When the polarity is reversed, the curvature is increased. The piezoelectric elements 144 are captured together around their peripheries by retainer clip ring 146 with one element pinned to housing 152 by insulating rivet 166 and the other element fastened to valve shaft 168 by insulating rivet 170. When the electric current is cycled through the piezoelectric elements, shaft 168 guided by seal and bearing 172 is rapidly and forcefully displaced from one extreme axial position to the other thereby producing bi-stable motion. Since the electrical and kinematic properties of the piezoelectric elements 144 may be adversely affected by immersion in fuel, the interior of housing 152 is maintained in equilibrium with ambient atmosphere by vent 174 and the sealing action of shaft seal and bearing 172. By these means the spool 90 connected to shaft 168 by pin 176 is rapidly shifted from one extreme position to another effecting a rapid cycling of the control valve 20 without appreciable fluid resistance or inertia.

[1] "Aura Ceramics, Inc. Rainbow High Displacement Actuation" sales Brochure, Minneapolis, Minn., 1994.

Figure 4B:
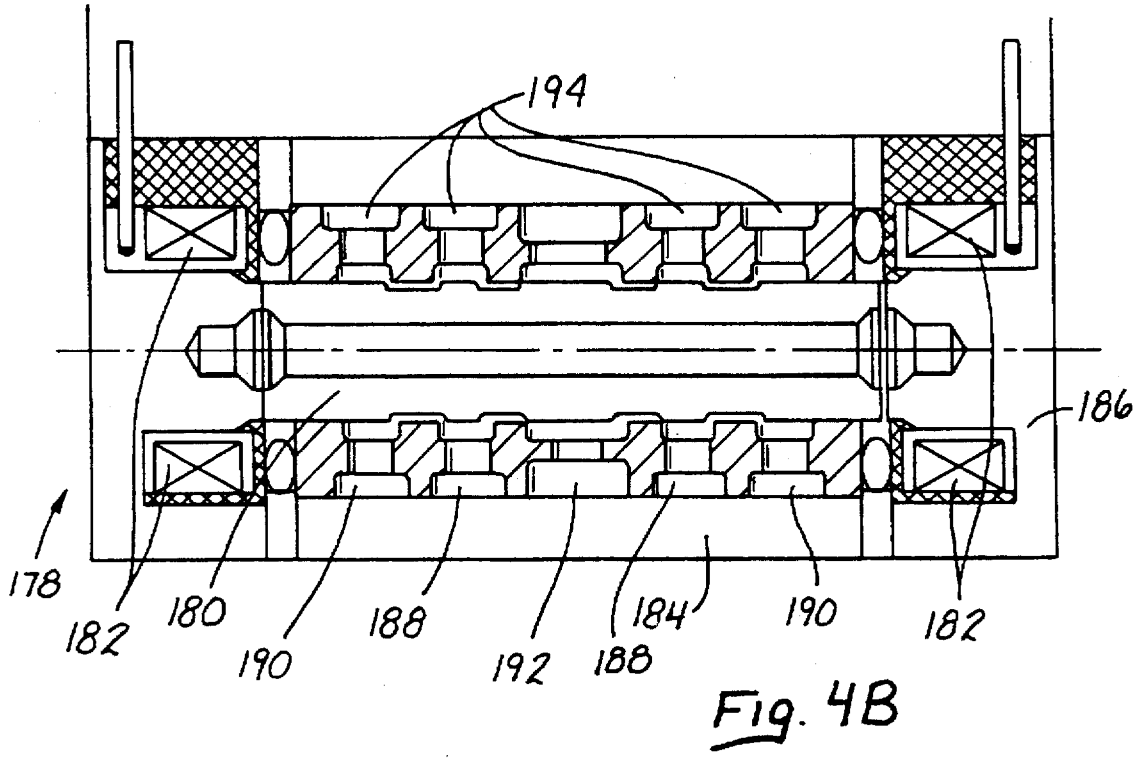
FIG. 4B shows a cross-section of a three-way, two-position balanced pressure spool valve actuated by a latching-solenoid.
Figure 4C:
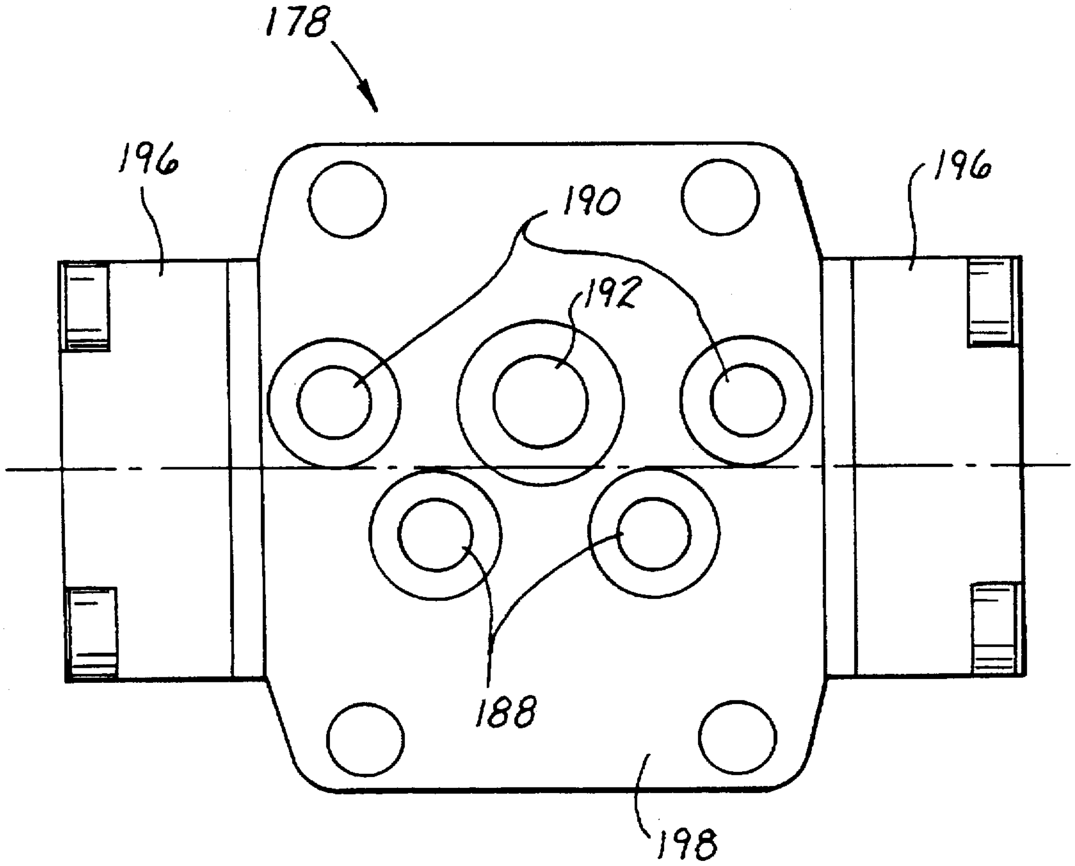
FIG. 4C shows a top plan view of the latching-solenoid type spool valve shown in FIG. 4B having five ports and a flange-type mounting.

FIG. 4B shows a cross-section of another preferred embodiment injector control valve 178, a balanced pressure latching-type solenoid of the Sturman type[2]. In this arrangement, valve spool 180 serves as the armature in a magnetic circuit including coils 182 and valve body 184. Pulses of electric current of suitable polarity provided to coils 182 alternatively cause a strong impulse of force on spool 180 along the axis of body 184 in one direction or the other. Residual magnetism in spool 180 and pole pieces 186 hold spool 180 in one extreme position or the other without any current flowing in either coil 182. In those extreme positions, spool 180 uncovers grooves in body 184 such that actuator control ports 188 communicate with either vent ports 190 or pressure port 192 via high flow passages 194. FIG. 4C shows a top plan view of the flange-type Sturman valve 178 with coil housings 196 on each end and ports 188, 190 and 192 in flange face 198.

[2] Carol and Eddie Sturman, "Breakthrough in Digital Valves," *Machine Design*, Penton Publications, Cleveland, Ohio, Feb. 21, 1994.

Figure 5A:
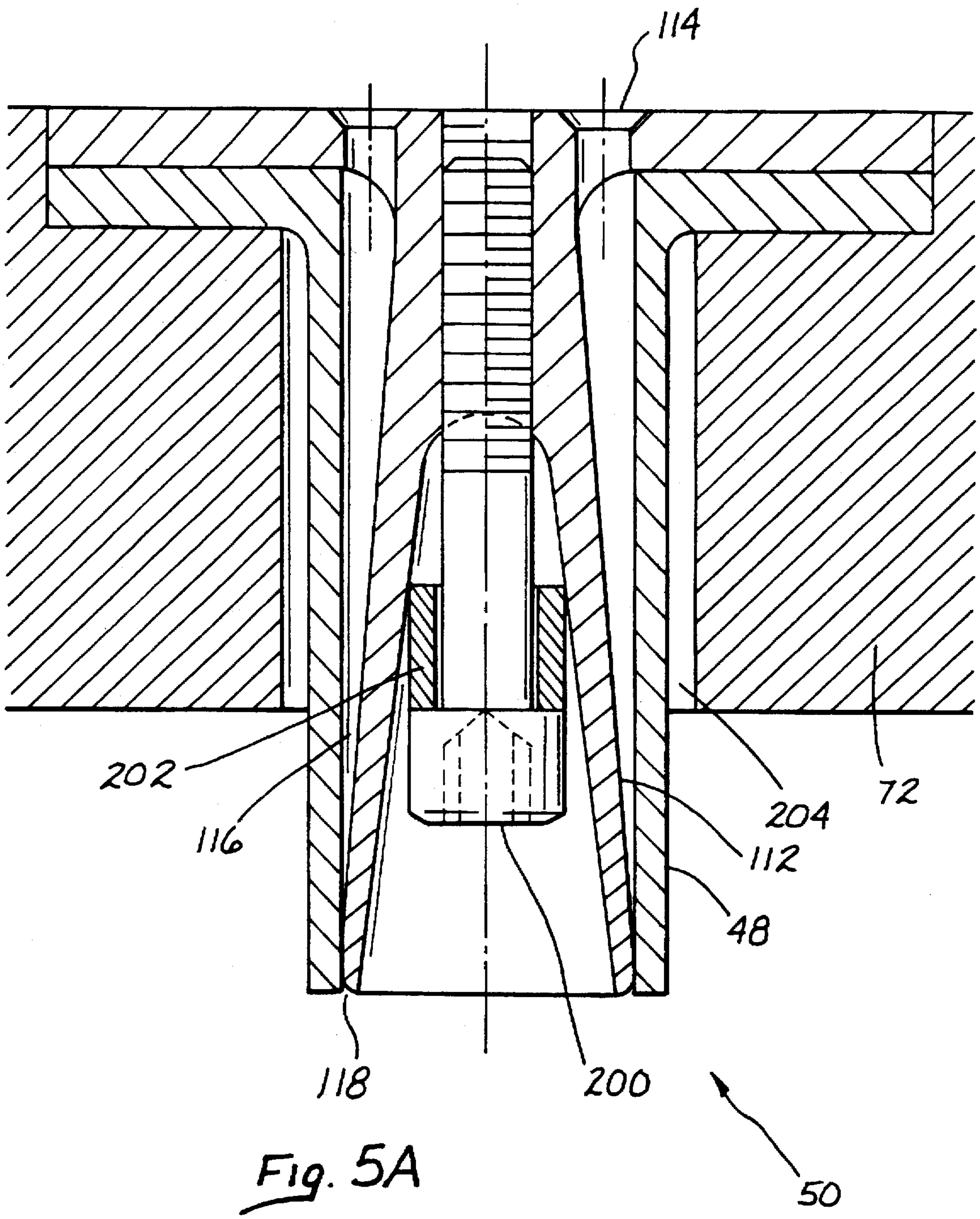
FIG. 5A shows a section view of an exemplary embodiment of an adjustable, axi-symmetric variable-area, outward-opening injection nozzle, having a flexible inner body.

FIG. 5A illustrates an exemplary embodiment of the axi-symmetric injection nozzle of FIG. 1, having a particular adjustment feature. As shown therein, inner body 112 of nozzle 50 is prestressed outwardly by cap screw 200 which when tightened against bushing 202, wedges said bushing against the tapered interior bore of inner body 112. The tensile stresses produced thereby elastically deflect the central portion of the inner body 112 outwardly increasing the pre-load of the outboard tip of that member against the counterpart of the outer tube 48 at the interface 118. The flexible nozzle members 112 and 48 may be made in a high strength, ductile, heat and corrosion resistant alloy steel or preferably of a titanium alloy of similar properties having a lower modulus of elasticity for improved flexure characteristics. FIG. 5A also shows air gap 204 provided between injector barrel 72 and nozzle outer tube 48 providing clearance for the outward flexural expansion of said tube as well as a degree of thermal isolation between tube 48 and barrel 72. The nozzle structure shown in FIG. 5A produces an axi-symmetric, thin, hollow sheet jet from an annular gap developed at the interface 118. Such jet sheet may be divergent, convergent or straight depending on the local geometry of members 112 and 48 at interface 118. The normally axi-symmetric jet pattern may be modified by the use of various arrangements of baffles, tabs, hoods, slots and the like which act as jet deflectors and vector controls.

Figure 5B:
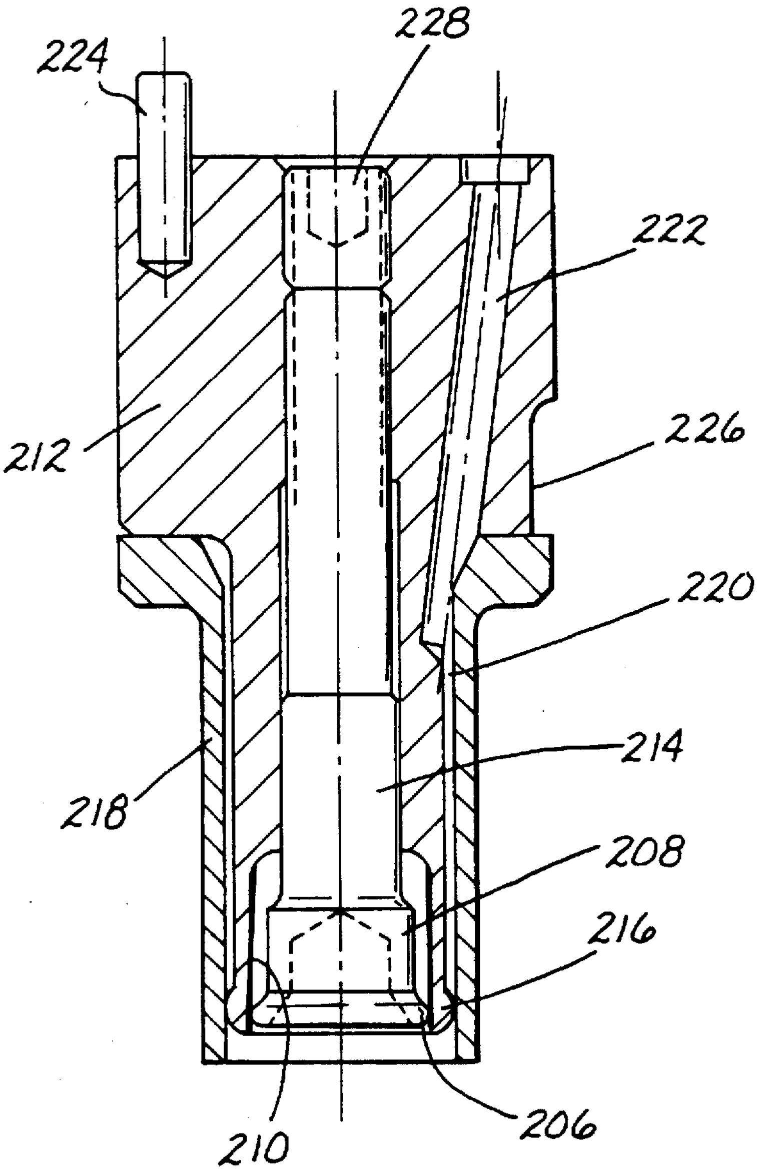
FIG. 5B shows a section view of another exemplary embodiment of an adjustable, axi-symmetric variable-area, outward-opening injection nozzle, having a rigid inner body.

FIG. 5B illustrates another exemplary embodiment of the axi-symmetric injection nozzle of FIG. 1, having a different adjustment feature. In this embodiment, head lip 206 machined in the outer perimeter of adjustment screw head 208 engages the tapered bore 210 in the outer extremity of inner body 212 such that when adjustment screw 214 is tightened, head lip 206 swages seat lip 216 machined on the outside perimeter of the outer extremity of inner body 212 radially outward, contacting the inner surface of outer tube 218 to form a fluid seal between inner body 212 and outer tube 218. Further flexural deflection of the thin cylindrical section of inner body 212 containing seat lip 216 in a radially outward direction by tightening adjustment screw 214 not only closes annular passage 220 between inner body 212 and outer tube 218 but wedges seat lip 216 against outer tube 218 forcefully to elastically deflect outer tube 218 radially and establish a pre-load tensile stress in the outer extremity of outer tube 218. A given tensile pre-load in outer tube 218 will establish, from a number of turns tightening screw 214, the fluid pressure level that must be attained in annular passage 220 before that fluid pressure will generate sufficient hoop tension in outer tube 218 to expand it outwardly away from seat lip 216 permitting fluid to flow from the nozzle.

Fluid is admitted into annular passage 220 via feed hole 222 which communicates with the injector plunger (not shown). Dowell pin 224 may be used to index the location of feed hole 222 to the injector assembly (not shown).

Inner body 212 is provided with wrench flats 226 to facilitate tightening of adjustment screw 214 and locking with set screw 228. Set screw 228 locks adjustment screw 214 against loosening by installing it into a common threaded boss and jambing it against the threaded end of adjustment screw 214 after its position is set.

Another feature of the nozzle embodiment shown in FIG. 5B is the minimal fluid volume that is enclosed in thin annular passage 220 and small feed hole 222. Fluid held up in this volume is part of the injector cup volume and is therefore subject to compressibility effects that impair the precision of injection pulses.

An alternative form of nozzle producing a flat fan type of spray as a sheet of particles is shown in FIGS. 6A–6C. This nozzle produces a much finer and more uniform spray pattern with higher velocities because, like the above structure, it opens outwardly without throttling, provides a flow area that is proportional to the injected flow rate and creates a sheet-type jet pattern which is capable of producing the greatest degree of atomization. Consequently, it delivers a high velocity spray with uniformly small particles at all flow rates and requires only a small range of pressures for a wide flow range. As shown in FIG. 6A, the nozzle is formed from a short section of thin-wall metallic tubing 230 of suitable material which is triangularly notched 232 and lapped to form a closely fitted joint such that the outward facing perimeter of the tube is closed when lapped surfaces 234 are pressed together (See FIG. 6B). The open end of tube 230 is squared 236 with the axis 238 by removal of material 240 and then held tightly in place by collet 242 against tapered plug 244. Collet 242 bears against the outside perimeter of tube halves 246 at a point 248 outboard of the point 250 where the hollow tapered plug 244 contacts the inside perimeter of the mated tube halves 246. The tapered plug 244 is tapered at a greater angle than the inside surface of the mated tube-halves 246 when closed such that tightening of the collet 242 forces tapered plug 244 against lapped sealing surfaces 252 on injector body 254 as well as against the inside surface of the tube-halves 246 around the inner perimeter of the inboard extremity of the tube 230. In addition, the peripheral pressure of the collet 242 against the tube halves 246 reacted to by the offset inside support of the tapered plug 244 pre-loads tube halves 246 together along their angularly cut and lapped surfaces 234 to completely seal the assembly against external leakage up to a given pressure. Above such a predetermined interior pressure, sufficient hoop and bending stresses are developed in the tubing halves 246 to overcome the pre-load and deflect them outwardly apart thereby opening the slit 256 at the lapped joint of tubing halves 246 forming a variable area nozzle. The opening pressure setting may be adjusted by varying the amount of torque applied to the collet 242 which, in turn, varies the clamping force holding tubing halves 246 together along lapped surfaces 234. The tapered plug 244 contains drilled passage 258 allowing fluid communication between cup 18 and nozzle sac 50. It also functions to displace fluid from the interior volume between tube halves that is subject to compressibility effects which detract from the precision of injection transients. FIG. 6C shows an outboard profile of the injector and the flat fan flow pattern 260 it produces.

Figure 7A:
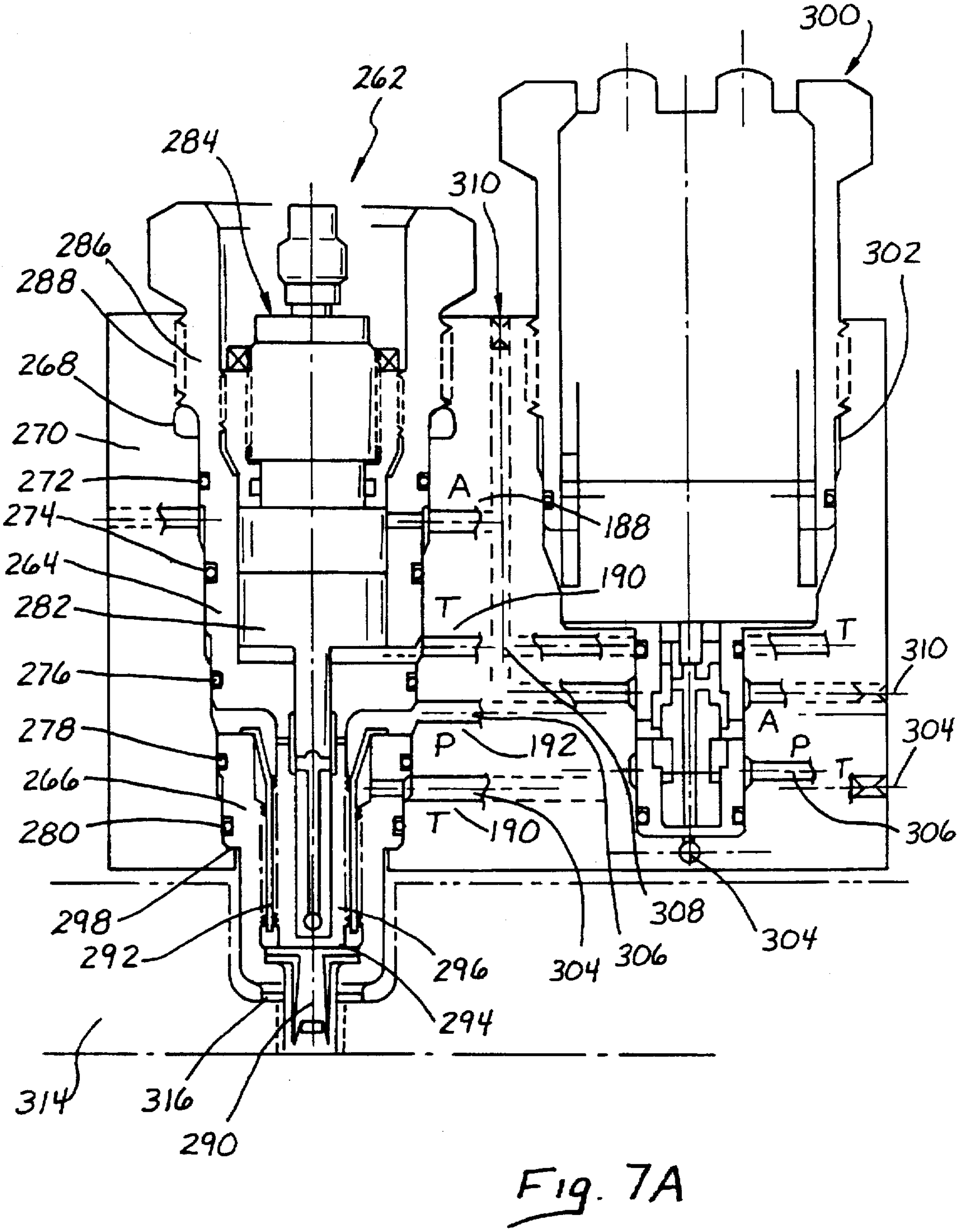
FIG. 7A shows an axial section view of a cartridge-type unit injector.

FIG. 7A shows a section view of the preferred embodiment injector and control valve packaged in cartridge form as a unit for installation directly on the cylinder of an engine. Injector cartridge 262 is comprised of two subassemblies, upper body 264 and outer barrel 266, both of which are fitted into machined cavity 268 in cartridge block 270 then sealed around their peripheries at appropriate locations by o-rings 272, 274, 276, 278 and 280. Upper body 262 contains piston assembly 282 and position sensor assembly 284. The outer end of upper body 264 comprises a standard straight thread fitting 286 that engages threaded boss 288 in block 270 to secure injector cartridge 262 in cavity 268. Outer barrel 266 containing nozzle assembly 290 and annular baffle 292 is captured in the bottom of cavity 268 by upper body 264 projecting the outer lapped surface 294 of plunger inner barrel 296 to bear against the inner lapped surface of nozzle assembly 290 to tighten bottom land 298 of outer barrel 266 against bottom land of cavity 268 when upper body threaded fitting 286 is tightened in threaded boss 288 of block 280.

Figure 7B:
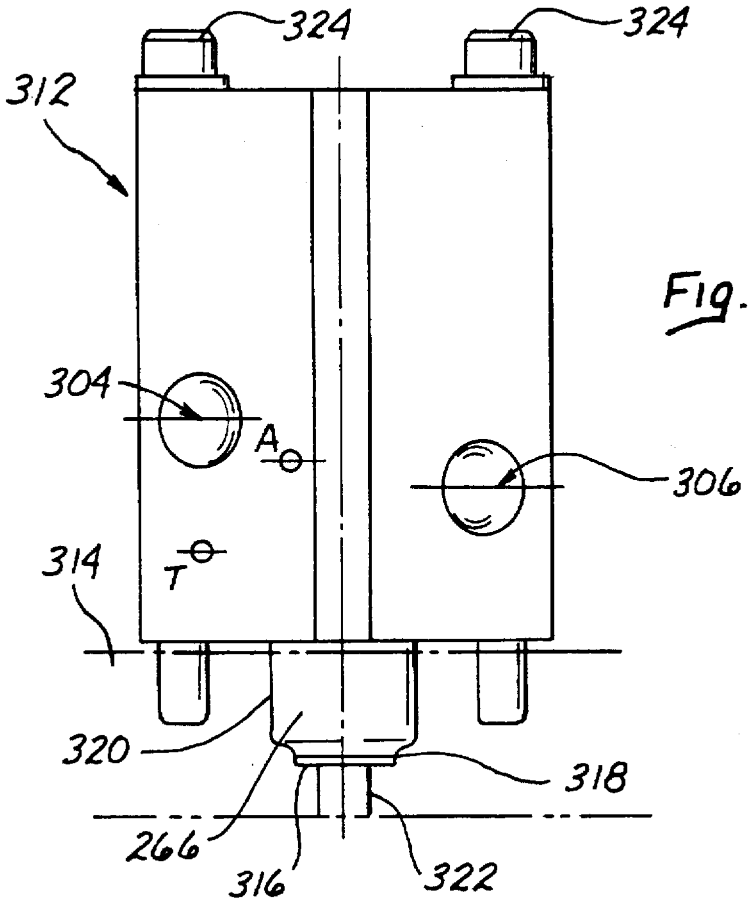
FIG. 7B shows an end view of the cartridge-type unit injector.

Control valve cartridge assembly 300 is similarly fitted and sealed into adjacent cavity 302 in block 280. Block 280 is provided with drilled passages 304, 306, 308 and 310 connecting ports 188, 190 and 192 between valve cartridge 300 and injector cartridge 262 in accordance with the flow paths shown in FIG. 1. Such passages also provide manifolding to external connections P and T (not shown) for convenience in external piping for multi-cylinder engine applications. FIG. 7B indicates the placement of the unit injector block assembly 312 on the surface of an engine cylinder head 314 with combustion seal 316 captured between land 318 on the projection of outer barrel 266 and counterbore 320 in cylinder head port 322. FIG. 7B also shows the location of external fuel connections 306 and 304 and bolts 324 for fastening unit injector cartridge 312 to engine cylinder 314.

Figure 7C:
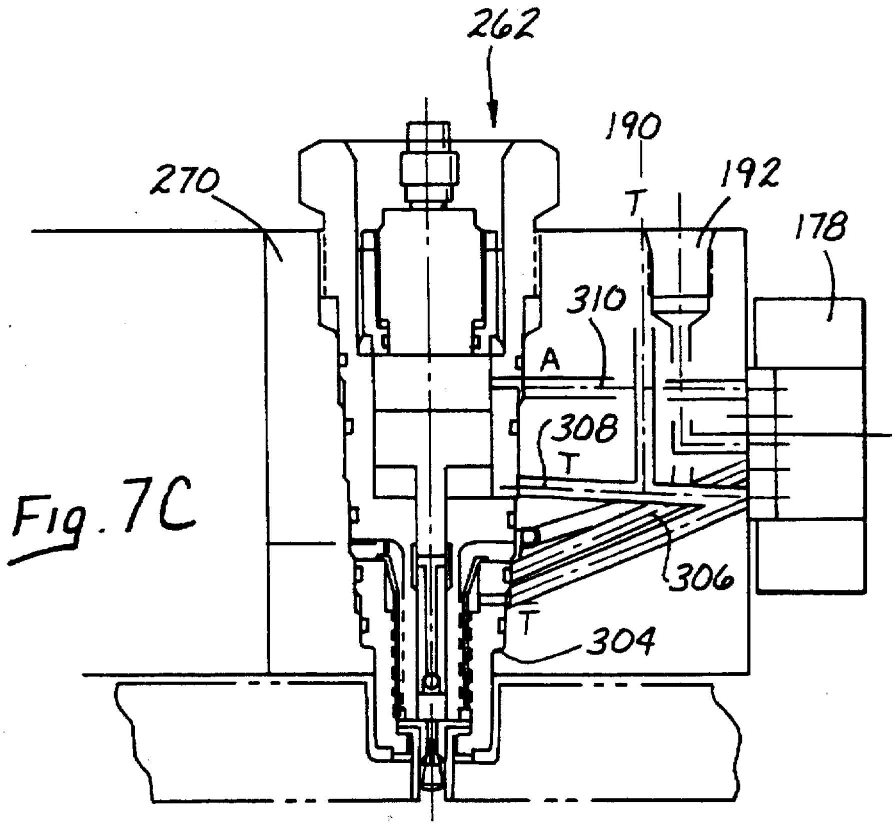
FIG. 7C shows a cartridge type unit injector incorporating a manifolded flange-mounted control valve of the latching-solenoid type.

FIG. 7C shows an alternate embodiment in which cartridge style injector 262 is fitted into block 270 that mounts flanged type control valve 178. Block 270 provides external rail connection ports 190 and 192 and internal manifold passages 304, 306, 308 and 310 connecting ports 190 and 192 to injector 262 and valve 178.

Figure 8A:
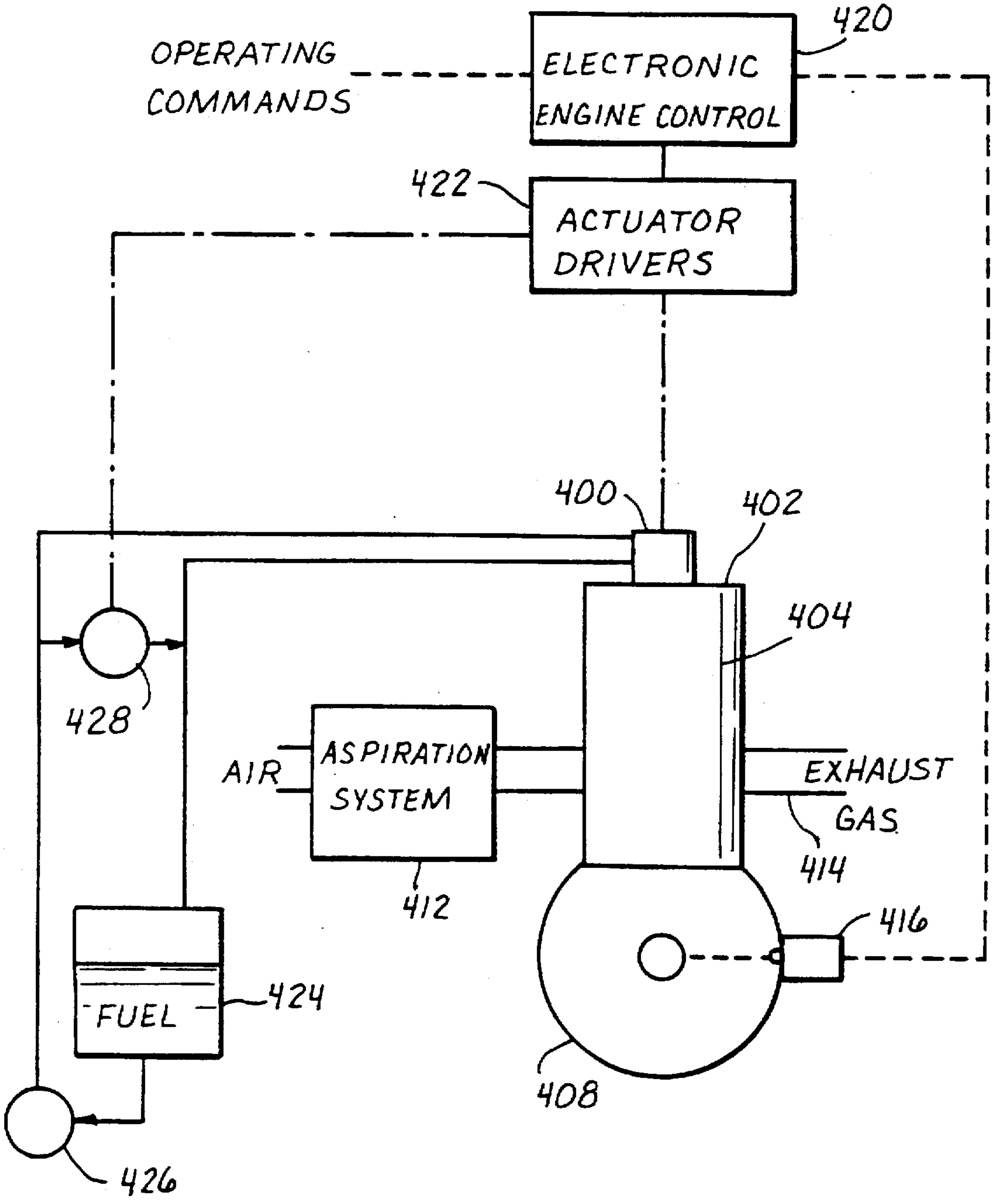
FIG. 8A shows a schematic diagram of a first exemplary embodiment of the electrohydraulic fuel injection system of my invention.

FIG. 8A shows a schematic diagram of an exemplary embodiment of the electrohydraulic fuel injection system of my invention installed on a typical reciprocating engine. An electrohydraulic injector unit 400 is shown installed in engine cylinder head 402 to inject a fuel into combustion chamber 404 synchronized with motion of piston 406. Engine 408 including crankcase 410, aspiration system 412 and exhaust system 414 is equipped with shaft position sensor 416 that provides information to electronic engine control microprocessor 420 which, receiving such signals, prepares electronic timing signals for triggering electrical actuator drivers 422 to power electric actuators of injector control valves in an appropriate manner. In other embodiments (not shown) there may be more than one injector unit 400, each of which would be supplied by a separate and distinct fuel, although it is understood that both injectors may be supplied by the same fuel from a common supply. Each fuel supply comprises fuel storage tank 424, fuel delivery means and fuel return means. Fuel delivery means may include means for tank pressurization from an external source (not shown). In a preferred embodiment, fuel supply means includes a means for regulating the pressure delivered from pump 426. Delivery pressure may be regulated by utilizing engine control microprocessor 420 to control the set point of an electrically-controlled pressure relief valve 428 or by varying the speed of an electrically-driven pump 426. Various ways to implement such means are known in prior art.

Figure 8B:
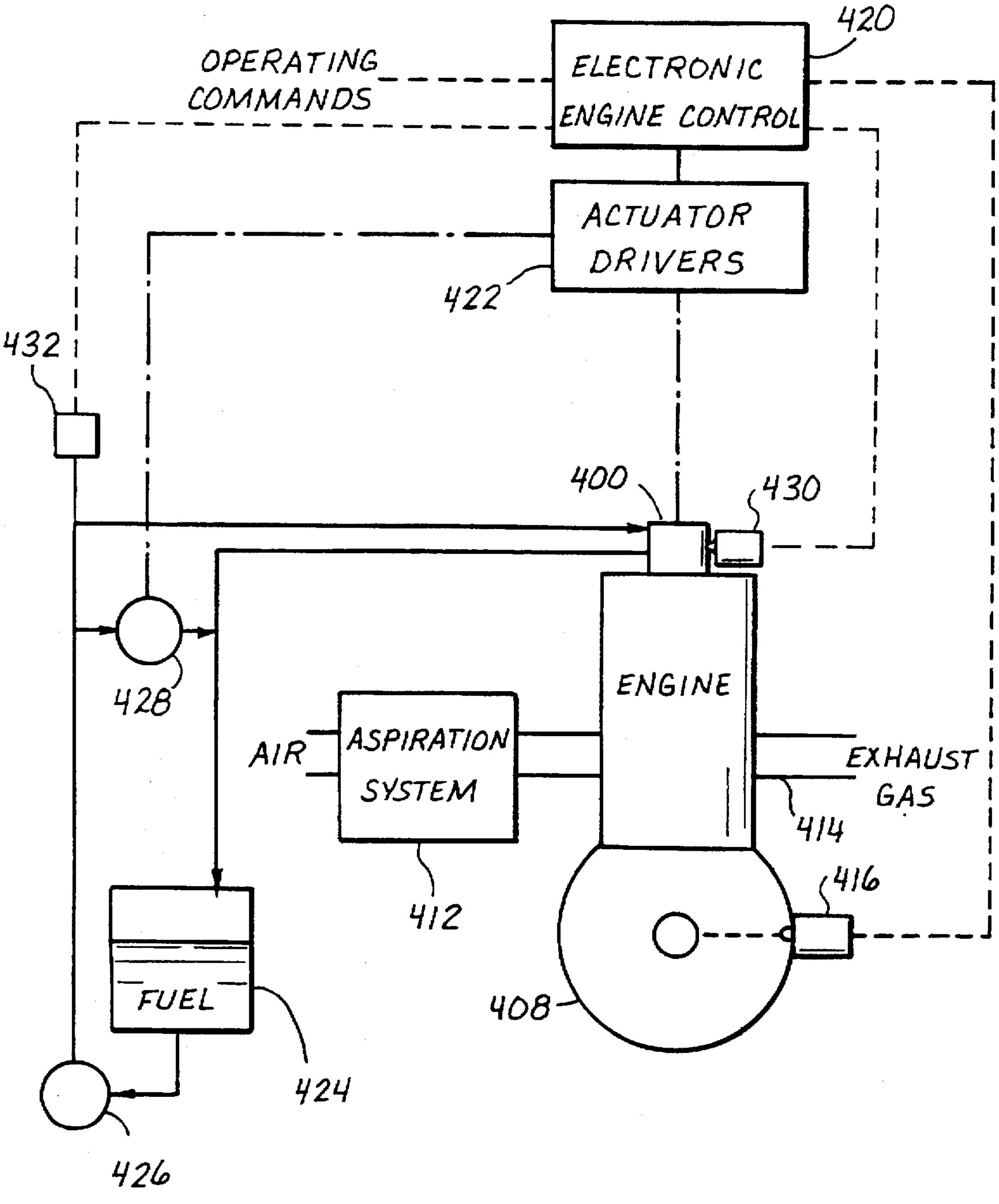
FIG. 8B shows a schematic diagram of an alternate exemplary embodiment of the electrohydraulic fuel injection system of my invention.

FIG. 8B shows a schematic diagram of an alternate exemplary embodiment of the electrohydraulic fuel injection system of my invention installed on a typical reciprocating engine. This system is similar to the system of FIG. 8A, except that it includes injector piston position sensor 430. In this embodiment, engine control microprocessor 420 includes signals from injector piston position sensor 430 in preparing electronic timing signals to trigger electrical actuator drivers 422 to power electric actuators of the injector control valve.

FIG. 9A depicts the control logic signal used to drive the injector control valve actuator. As indicated therein, the metering event begins with a logic signal pulsed to positive at a time corresponding to an engine phase angle advanced from top center an amount calculated by the microprocessor to account for the following factors:

(1) Injection delay (varies with temperature, pressure, fuel type, load and speed but can be mapped and programmed);

(2) Transport delays (electrical, mechanical and fluid-all virtually constant);

(3) Metering time (varies with demand for power and rail pressure but known in advance and can be checked and corrected by injector piston position feedback control); and (4) Injection time.

At this time, injector actuation chamber port 34 is closed to the pressure rail and opened to tank return by switching the state of control valve 20. Actuation chamber pressure falls to return pressure allowing cup 18, initially at injector nozzle relief pressure, to fill with fuel under rail pressure and accelerate piston 14 toward the top of its stroke. The upward recoil of the plunger 12/piston 66 assembly coupled with the inertia of ball check valve 22 and the fluid column in plunger bore 24 acts to open that passage to flow into cup 18. After the initial kick due to the residual injection pressure in cup 18, piston 66 moves upwardly at a virtually constant rate of about 0.5 m/s for from 0.05 to 10.0 milliseconds depending on the fuel quantity to be metered and the rail pressure used. FIGS. 9B and 9C show the resulting pressure traces in actuation chamber 22 and cup 24 respectively corresponding to the metering operations described.

As shown in FIG. 9A, injection is signaled to begin at the instant the metering event is completed. This event is indicated in FIG. 9A as a reversal in polarity of the logic signal. As indicated above, such timing is anticipated in the initiation of the metering event. Following the short transport delays indicated above, the control valve state is reversed thereby closing actuation chamber port 34 to tank return and opening said port to rail pressure. Actuation chamber pressure rises rapidly to rail pressure which, acting on the relatively large area piston 66, accelerates plunger 12 rapidly in the downward direction attaining speeds exceeding 5 m/s and developing pressures in cup 18 that are more than ten times rail pressure as determined by the actuator piston to plunger area ratio, the opening pressure of nozzle 50 and the back pressure prevailing at nozzle 50.

As shown in FIG. 9C, injection begins when the cup pressure, amplified over rail pressure, exceeds the nozzle seating pressure which occurs upon the rise of actuation chamber pressure toward the rail pressure level as shown in FIG. 9B. Injection ends when the bottom end of plunger 12 comes to rest against the face of nozzle 50 whereupon further motion ceases and the cup pressure falls to nozzle seating pressure ending flow from nozzle 50. This state prevails until the microprocessor determines and initiates the next metering event. Such determinations are synchronized with the engine cycle. The repetition rate of each injector is normally equal to the cycle rate of the engine. However, a skip-fire mode of operation may be used in which injector operation is interrupted in a scheduled manner to conserve fuel at very light loads such as idling. The metering time varies with the engine load to be served and the timing of injection is projected to occur at the termination of metering. Thus the initiation of metering anticipates not only the load to be served but also such other factors influential on injection timing as speed, fuel characteristics, engine temperature, ambient conditions, rail pressure, exhaust emissions and possibly other factors which can be programmed into the microprocessor, such as timing the end of injection by controlling the rail pressure.

The microprocessor facilitates two modes of control of injector timing. Open-loop timing is calculated from a programmed schedule based on known engine characteristics (an engine map stored in memory) and instantaneous measurements of shaft speed and position. This mode of control occurs during rapid transients in engine operating conditions when the processing of injector piston position sensor information may lag changes indicated from faster engine map look-up. The other mode of control, closed-loop timing relies on the application of feedback information derived from the injector piston position sensor utilizing proportional-plus-integral-plus-derivative (PID) control loop methods well known in the art of automatic control. When cycle-to-cycle changes are small, the microprocessor relies on a PID loop determination to reset the timing parameters governing the logic signal whereby significant improvements in cycle-to-cycle metering and timing precision can be effected.

FIG. 10 illustrates the metering pulse waveforms produced in the open loop mode of operation of my invention in response to commanded metering state durations of various lengths. The metered quantity is a function of the actual control valve spool travel accomplished within a given commanded interval of time during which metering is to occur. As shown in FIG. 10, because of the finite rate of valve spool travel, control port 48 is not fully opened and closed instantaneously. On this account, the actual pulse shape departs from the square-wave command pulse shape as the magnitude of the command pulse is reduced. At about 0.25 ms, the actual pulse shape becomes saw-toothed.

Below this point, the pulse may fail to achieve full travel but an effective flow pulse results nevertheless.

FIG. 11 shows how this pulse waveform characteristic affects injector delivery and precision. As the commanded duration diminishes, the actual pulse volume diminishes in a non-linear fashion such that the actual pulse volume metered is a sharply reduced fraction of the equivalent square-wave command. Because of random timing errors inherent in open log operation, such turn-down is accompanied by an increase in pulse-to-pulse variations.

However, subject to this loss of precision, this non-linear characteristic enables a larger range of metering than would otherwise be possible based on pulse duration timing alone because very small actual pulses can be obtained repeatably with relatively long commanded pulse widths. In other words, the range of actual fuel pulse magnitudes is much larger than the range of pulse durations required to produce them. This minimizes the effect of timing errors on the precision of metering and delivering small pulse quantities. The precision of this mode of operation can be enhanced by using control valve spool position feedback in the computerized management of the metering cycle. Such feedback can be provided by various positive sensors including LVDT's. The Sturman-type actuator is advantageous in this regard because its dormant coil acts as such a sensor. A preferred embodiment injector is capable of open-loop turndown of over 30:1 with less than ten percent pulse-to-pulse variance.

The closed-loop mode of operation controls the delivered pulse directly by modifying the timing pulse to achieve a certain piston displacement. The precision of the position sensor being somewhat greater than the position control using open loop timing commands, closed-loop operation results in substantial improvements in the pulse-to-pulse repeatability of small pulse volumes. As a result, closed-loop operation can extend the range of injector operation to somewhat lower deliveries and thereby achieve larger turndown ratios. The non-linear characteristic described above is also advantageous in this mode of operation because it allows more time to accomplish closed-loop calculations than would otherwise be available.

Closed-loop control of metering using injector plunger position feedback in the preferred embodiment injector eliminates the timing errors inherent in open-loop operation. This mode of operation becomes effective following a few cycles of operation with small changes in demand. At this point, the preferred embodiment injector provides upwards of 60:1 turndown with only two percent pulse variance.

In my invention, the initiation of injection is also the termination of metering. The termination of metering is controlled in two stages:

a. Open Loop

This is a default mode in which the time to terminate metering and to initiate injection is calculated from memory (engine and injector map data), shaft position input, load input, and pressure inputs. Basically, the appropriate phase angles are determined and switching logic timing is computed and triggered based on instantaneous shaft speed and position.

b. Closed Loop

This is the quasi-steady-state mode that applies injector piston position data in a PID loop control routine to minimize the deviation of injector timing and metering results from those values commanded and programmed. The primary sensor inputs required for this method of control are shaft angular position and injector plunger position. Shaft speed can be calculated from shaft position or separately generated.

Injection ends when plunger 12 strikes the nozzle face on its downward stroke. The end of injection occurs within a short span of time following injection initiation depending on the dynamics of the piston 66/plunger 12, control valve 20, nozzle 50, metered quantity, rail pressure and chamber pressure. Since the end of injection event is influenced by rail pressure, it can be adjusted electronically if desirable. Thus, the injection pulse duration can be modulated to some extent by controlling rail pressure either by open loop timing or by closed loop means using injector position sensor input. The latter method would effectively control the ending of injection event within the physical limitations of the injection system and the fuel supply pump.

The initiation of metering is the critical timing event. It occurs after an off-cycle period that varies widely depending on load and speed. The time to begin metering is advanced from time to end metering (begin injection) by the time increment required to displace the injector plunger the amount required to fill cup 18 with that quantity of fuel called for to satisfy the engine's load. That quantity may be commanded either by an operator (manual throttle, electronic variety) or by a governor reset by an automation system. These timing characteristics can be known from calibration results and corrected in operation from injector piston position sensor data. The logic to initiate metering subsumes that to initiate injection and is therefore the primary timing requirement because it must anticipate both the time required to meter as well as the time for injection to begin at the proper engine phase angle. The computational speed required to implement the closed-loop control logic envisioned is about 1 MHz (less than $1\times10^{-6}$ sec). This speed would also satisfy the open loop mode of control.

Any number of commercially available single-board microprocessors and/or digital signal processors are capable of implementing the system. However, higher shaft speed and larger numbers of cylinders will require the more powerful versions of these microprocessors in order to handle overlapping injector cycles at high load conditions. Certain of these units have been developed for automotive engine control applications.

The amount of computer power required also depends on the degree of sophistication used in the sensors and for their signal conditioning. For example, reading the injector piston position sensor with the simplest type A–D conversion might take as long as 64 s. Injector piston speeds during metering are less than 1.0 mm/ms. At such a rate, position resolution would be 0.064 mm which is about 1.0 percent of the maximum stroke. The sensor resolution itself is approximately 0.002 mm at minimum stroke and 0.0003 mm at maximum stroke. Thus, without greater reading speed for this function, timing errors would predominate and consequently limit the turndown range. By using "flash" type A–D conversion for the position sensors, read times of less that 2.0 s can be obtained at which point sensor resolution would prevail without additional computer power.

Closed loop control of metering using piston position feedback eliminates the errors inherent in open loop operation. This mode of operation becomes effective following a few cycles during which only small changes in demand occur. In the meantime, the default (open loop) mode of operation suffices to maintain control. This characteristic is typical of computerized automotive engine control utilizing exhaust gas sensors for closed-loop operation and is successfully employed in most automobiles now in production.

The contemplated system has two sensor requirements that may be considered novel for a diesel fuel injection and engine control system. These are the plunger position sensor 26 and the engine drive shaft position sensor 416. The plunger position sensor requirement is readily satisfied with off-the-shelf hardware available from Kaman, Capacitec, Lucas and others. The non-contact, eddy-current type detector provides ample precision, response, ruggedness and simplicity (Kaman, 1992). Such an instrument is shown in FIG. 7A. The shaft position information required for the contemplated system can be derived from a simple magnetic pickup that gives one shaft location each revolution. Angular rates and piston phasing can be calculated from such a signal given an accurate time reference and sufficient computer power and speed. However, the use of a "smart" shaft sensor such as a rotary encoder (Lucas Ledex, 1991) can provide accurate angular locations of every significant engine phase-event as well as an almost instantaneous basis for calculating shaft speed and acceleration. Such sophisticated shaft sensing can save a considerable amount of computer power and memory such that the most readily available automotive engine control microprocessors utilizing EPROM programming and memory can be used.

From FIG. 8, it is readily seen how the fuel injection system of my invention facilitates the operation and control of a diesel engine on a single compression ignition fuel such as petroleum distillate. Also possible is the use of multiple injectors which can facilitate staged injection, a technique known in the art for increasing the air utilization in such engines and, consequently, the smoke limited power output available.

CONCLUSIONS, RAMIFICATIONS AND SCOPE OF INVENTION

In the preceding narrative, I have described by method and means, structure and apparatus for full-authority, electronic control, of fuel injection in a compression ignition engine. By full authority it is meant that the management of the engine's combustion process is effected by automatic control means external to the engine to satisfy power and speed demands subject to ambient conditions and fuel characteristics. The application of such capabilities to emission-controlled engine power situations is obvious.

The system of my invention manages the timing, quality and quantity of injection in response to shaft speed and load, piston position, temperatures, combustion pressures, vibration and the like. Thus, the reader will see that the injector of my invention provides a simple, reliable and effective method and means for accomplishing cylinder injection of consumables in internal combustion engines. It can now be readily appreciated how such means can provide full-authority control of the fueling of such engines whether locally, remotely, manually or automatically managed and regardless of the cooling that may be available from or air supplied to the engine to which it is applied.

While my above description contains many specificities, these should not be construed as limitations on the scope of the invention, but rather as an exemplification of certain preferred embodiments thereof. Many other variations are possible. For example, injection may be staged by pulsing the control valve at predetermined intervals in the engine cycle. In addition, multiple injectors may be used in a given engine cylinder and such injectors, whether or not there are multiple cylinders in an engine, may be individually controlled. Such control may consist of modulation in a manner normally employed in operating diesel engines or it may be used in a skip-fire mode in which fueling a given cylinder may be omitted at intervals during certain engine operating conditions. Since the injection system of my invention can operate independently of engine rotation, it can be operated in such a manner as to facilitate starting without cranking by using a hypergolic fuel and oxidizer combination such as diesel with nitric acid as well as other similar fuel/oxidizer pairs which ignite on contact. Further embodiments such as the injection of multiple fuels and/or oxidizers or fuels of variable composition and properties are also anticipated. In addition, when self cooling is not required, the injectors may be operated from a source of low-pressure fuel stored in a tank thereby eliminating the need for a mechanical pump or pressure regulator. Accordingly, the scope of the invention should be determined not by the embodiments illustrated, but by the appended claims and their legal equivalents.

What is claimed is:

1. An electro-hydraulic fuel injector system comprising:

a fuel injector housing comprising a first housing portion including a first chamber having a head space and a second housing portion including a second chamber having a floor;

a piston closely fitted within said housing and adapted to freely oscillate between said head space and said floor and adapted to mate intimately against said floor;

a first housing port in fluid communication with said head space;

a fluid passageway within said piston, said fluid passageway in fluid communication with said second chamber;

a second housing port in said second housing portion, said second housing port in fluid communication with said piston fluid passageway and said second chamber;

a check valve within said piston fluid passageway, adapted to permit fluid to flow through said piston fluid passageway and into said second chamber and to prevent fluid from flowing from said second chamber back into said piston fluid passageway;

a nozzle fitted within said second chamber and having an inner face forming said second chamber floor and adapted to open under fluid pressure to permit fluid to flow out of said second chamber;

hydraulic means for oscillating said piston; and means for controlling the flow of fluid through said first housing port into said first chamber.

2. The fuel injector system of claim 1 wherein said first chamber and said second chamber have predetermined respective cross-sections and wherein said flow controlling means further comprises means for metering the flow of fluid out of said first chamber through said first housing port.

3. The fuel injector system of claim 2 wherein said metering means comprises a position sensor in said first chamber to monitor the position of said piston.

4. The fuel injector system of claim 2 wherein said metering means comprises means for timing the flow of fluid out of said first chamber through said first housing port.

5. The fuel injector system of claim 1 further comprising:

a first fluid source in fluid communication with said fluid flow controlling means and said second housing port;

means for pressurizing fluid flowing from said first fluid source to said fluid flow controlling means at a first predetermined pressure level and for pressurizing fluid flowing from said first fluid source to said second housing port at a second predetermined pressure level.

6. The fuel injector system of claim 5 wherein said fluid pressurizing means comprises a first fluid pump between said first fluid source and said fluid flow controlling means for pressurizing said fluid at a first predetermined pressure level and a second fluid pump between said first fluid source and said second housing port for pressurizing said fluid at a second predetermined pressure level.

7. The fuel injector system of claim 5 wherein said fluid pressurizing means comprises a fluid pump for pressurizing said fluid at a first predetermined pressure level and a pressure reducing means comprising a fluid pathway connecting said fluid pump to said second housing port and a pressure regulating valve in said fluid pathway between said fluid pump and said second housing port for pressurizing said fluid at a second predetermined pressure level.

8. The fuel injector system of claim 5 wherein said fluid pressurizing means comprises a fluid pump for pressurizing said fluid at a first predetermined pressure level and a stepped piston head at said first piston end for pressurizing said fluid at a second predetermined pressure level.

9. The fuel injector system of claim 8 further comprising:

a clearance volume in said first chamber beneath said piston; and a third housing port in said first housing portion in fluid communication with said clearance volume and adapted to drain fluid from said clearance volume.

10. The fuel injector system of claim 1 wherein said first chamber has a greater cross-section than said second chamber, and wherein said system further comprises:

a stepped piston head at said first piston end;

a clearance volume in said first chamber beneath said piston head;

a third housing port in said first housing portion in fluid communication with said clearance volume and adapted to drain fluid from said clearance volume;

a first pressurized fluid source in fluid communication with said fluid flow controlling means and said second housing port; and a first fluid reservoir in fluid communication with said fluid flow controlling means and said third housing port.

11. The fuel injector system of claim 10 further comprising:

a housing fluid passageway within said second housing portion in thermal communication with said piston, said piston fluid passageway and said nozzle; and a fourth housing port in said second housing portion in fluid communication with said housing fluid passageway and adapted to drain fluid from said housing fluid passageway.

12. The fuel injector system of claim 11 wherein said first pressurized fluid source is a pressurized fuel source, wherein said first fluid reservoir is a fuel tank, and wherein said fluid passageway is in fluid communication with said second housing port and said fuel tank is in fluid communication with said fourth housing port so that fuel can be utilized as a coolant.

13. The fuel injector system of claim 11 further comprising a second pressurized fluid source in fluid communication with said second housing port and a second fluid reservoir in fluid communication with said fourth housing port, wherein said first pressurized fluid source comprises a pressurized hydraulic fluid source and said second pressurized fluid source comprises a pressurized fuel source.

14. The fuel injector system of claim 13 wherein said pressurized fuel source is under less pressure than said pressurized hydraulic fluid source and wherein said piston further comprises a bias means within said clearance volume adapted to bias the motion of said piston head towards said head space.

15. The fuel injector system of claim 14 wherein said bias means comprises a spring.

16. The fuel injector system of claim 11 wherein said first pressurized fluid source comprises a pressurized fuel source and said first fluid reservoir comprises a fuel tank, and wherein said system further comprises:

a fifth housing port in said second housing portion in fluid communication with said housing fluid passageway;

a second pressurized fluid source comprising a pressurized coolant source, wherein said coolant source is in fluid communication with said fifth housing port; and a second fluid reservoir comprising a coolant tank, wherein said coolant tank is in fluid communication with said fourth housing port.

17. The fuel injector system of claim 11 wherein said first pressurized fluid source comprises a pressurized hydraulic fluid source and said first fluid reservoir comprises a hydraulic fluid tank, and wherein said system further comprises:

a fifth housing port in said second housing portion in fluid communication with said housing fluid passageway;

a second pressurized fluid source comprising a pressurized coolant source, wherein said coolant source is in fluid communication with said fifth housing port;

a second fluid reservoir comprising a coolant tank, wherein said coolant tank is in fluid communication with said fourth housing port; and a third pressurized fluid source comprising a pressurized fuel source in fluid communication with said second housing port.

18. The fuel injector system of claim 17 wherein said pressurized fuel source is under less pressure than said pressurized hydraulic fluid source and wherein said piston further comprises a bias means within said clearance volume adapted to bias the motion of said piston towards said head space.

19. The fuel injector system of claim 18 wherein said bias means comprises a spring.

20. The fuel injector system of claim 1 wherein said means for controlling fluid flow comprises a two-position, three-way spool valve.

21. An electro-hydraulic fuel injector assembly comprising:

a fuel injector housing having an upper portion forming an upper chamber having a predetermined first cross-section, said upper chamber having a head space and a lower portion forming a lower chamber having a predetermined second cross-section, said lower chamber having a floor;

a piston assembly closely fitted within said housing and adapted to freely oscillate therein, said piston assembly comprising a piston head attached to a plunger, wherein said piston head is fitted within said upper chamber and said plunger is fitted within said lower chamber and adapted to rest intimately against the floor of said lower chamber when said plunger is at rest;

a first housing port in said upper housing portion, said first housing port in fluid communication with said head space;

a fluid passageway within said plunger, said fluid passageway in fluid communication with said lower chamber;

a second housing port in said lower housing portion, said second housing port in fluid communication with said plunger fluid passageway;

a check valve within said plunger fluid passageway, adapted to permit fluid to flow through said plunger fluid passageway and into said lower chamber and to prevent fluid from flowing from said lower chamber back into said plunger fluid passageway;

a nozzle fitted within said lower chamber and having an inner face forming said lower chamber floor and adapted to open under fluid pressure to permit fluid to flow out of said lower chamber;

a clearance volume in said upper chamber beneath said piston;

a third housing port in said upper housing portion in fluid communication with said clearance volume and adapted to drain fluid from said clearance volume;

a position sensor in said upper chamber to monitor the position of said piston for metering the flow of fluid out of said upper chamber through said first housing port;

a fluid passageway within said lower housing portion in thermal communication with said plunger, said plunger fluid passageway and said nozzle, said fluid passageway in fluid communication with said second housing port so that fuel can be utilized as a coolant; and a fourth housing port in said lower portion of said housing in fluid communication with said fluid passageway and adapted to drain fluid from said fluid passageway.

22. The electro-hydraulic fuel injector assembly of claim 21 further comprising a control system comprising:

timing means in electronic communication with said position sensor for timing the flow of fluid out of said upper chamber through said first housing port;

a pressurized fuel source in fluid communication with said second housing port;

a fluid reservoir in fluid communication with said third housing port and said fourth housing port; and control means in fluid communication with said pressurized fuel source and said fluid reservoir and in electronic communication with said timing means for controlling the flow of fluid through said first housing port into said upper chamber.

23. The fuel injector system of claim 21 wherein said plunger fluid passageway comprises a bore within said plunger.

24. An electro-hydraulic fuel injector system comprising:

a fuel injector housing having an upper portion forming an upper chamber having a predetermined first cross-section, said upper chamber having a head space and a lower portion forming a lower chamber having a predetermined second cross-section, said lower chamber having a floor;

a piston assembly closely fitted within said housing and adapted to freely oscillate therein, said piston assembly comprising a piston head attached to a plunger, wherein said piston head is fitted within said upper chamber and said plunger is fitted within said lower chamber and adapted to rest intimately against the floor of said lower chamber when said plunger is at rest;

a first housing port in said upper housing portion, said first housing port in fluid communication with said head space;

a fluid passageway within said plunger, said fluid passageway in fluid communication with said lower chamber;

a second housing port in said lower housing portion, said second housing port in fluid communication with said plunger fluid passageway;

a check valve within said plunger fluid passageway, adapted to permit fluid to flow through said plunger fluid passageway and into said lower chamber and to prevent fluid from flowing from said lower chamber back into said plunger fluid passageway;

a nozzle fitted within said lower chamber and having an inner face forming said lower chamber floor and adapted to open under fluid pressure to permit fluid to flow out of said lower chamber;

a clearance volume in said upper chamber beneath said piston; and a third housing port in said upper housing portion in fluid communication with said clearance volume and adapted to drain fluid from said clearance volume;

means for timing the flow of fluid out of said upper chamber through said first housing port; and means for controlling the flow of fluid through said first housing port into said upper chamber.

25. An electro-hydraulic fuel injector system comprising:

a fuel injector housing comprising a first housing portion including a first chamber having a head space and a second housing portion including a second chamber having a floor;

a piston closely fitted within said housing and adapted to freely oscillate between said head space and said floor and adapted to mate intimately against said floor;

a first housing port in fluid communication with said head space;

a fluid passageway within said piston, said fluid passageway in fluid communication with said second chamber;

a second housing port in said second housing portion, said second housing port in fluid communication with said piston fluid passageway and said second chamber;

a check valve within said piston fluid passageway, adapted to permit fluid to flow through said piston fluid passageway and into said second chamber and to prevent fluid from flowing from said second chamber back into said piston fluid passageway;

a nozzle fitted within said second chamber and having an inner face forming said second chamber floor and adapted to open under fluid pressure to permit fluid to flow out of said second chamber;

hydraulic means for oscillating said piston;

means for controlling the flow of fluid through said first housing port into said first chamber;

a first fluid source in fluid communication with said fluid flow controlling means and said second housing port; and means for pressurizing fluid flowing from said first fluid source to said fluid flow controlling means at a first predetermined pressure level and for pressurizing fluid flowing from said first fluid source to said second housing port at a second predetermined pressure level.

26. An electro-hydraulic fuel injector system comprising:

a fuel injector housing comprising a first housing portion including a first chamber having a head space and a second housing portion including a second chamber having a floor and wherein said first chamber has a greater cross-section than said second chamber;

a piston having a stepped piston head at a first piston end, said piston closely fitted within said housing and adapted to freely oscillate between said head space and said floor and adapted to mate intimately against said floor;

a clearance volume in said first chamber beneath said piston head;

a first housing port in fluid communication with said head space;

a fluid passageway within said piston, said fluid passageway in fluid communication with said second chamber;

a second housing port in said second housing portion, said second housing port in fluid communication with said piston fluid passageway and said second chamber;

a third housing port in said first housing portion, said third housing port in fluid communication with said clearance volume and adapted to drain fluid from said clearance volume a check valve within said piston fluid passageway, adapted to permit fluid to flow through said piston fluid passageway and into said second chamber and to prevent fluid from flowing from said second chamber back into said piston fluid passageway;

a nozzle fitted within said second chamber and having an inner face forming said second chamber floor and adapted to open under fluid pressure to permit fluid to flow out of said second chamber;

hydraulic means for oscillating said piston;

means for controlling the flow of fluid through said first housing port into said first chamber;

a first pressurized fluid source in fluid communication with said fluid flow controlling means and said second housing port;

a first fluid reservoir in fluid communication with said fluid flow controlling means and said third housing port;

a housing fluid passageway within said second housing portion in thermal communication with said piston, said piston fluid passageway and said nozzle; and a fourth housing port in said second housing portion in fluid communication with said housing fluid passageway and adapted to drain fluid from said housing fluid passageway.

* * * * *